(12) United States Patent
Rosenthal et al.

(10) Patent No.: US 11,450,941 B2
(45) Date of Patent: Sep. 20, 2022

(54) INFLATABLE SUPPORT STRUCTURES AND RELATED SYSTEMS

(71) Applicant: Navatek LLC, South Kingstown, RI (US)

(72) Inventors: Ben Rosenthal, South Kingstown, RI (US); James Stusse, South Kingstown, RI (US)

(73) Assignee: Navatek LLC, South Kingstown, RI (US)

( * ) Notice: Subject to any disclaimer, the term of this patent is extended or adjusted under 35 U.S.C. 154(b) by 302 days.

(21) Appl. No.: 16/794,941

(22) Filed: Feb. 19, 2020

(65) Prior Publication Data

US 2021/0257710 A1   Aug. 19, 2021

(51) Int. Cl.
*H01Q 1/12* (2006.01)
*H01Q 1/08* (2006.01)
*F16M 11/00* (2006.01)

(52) U.S. Cl.
CPC ........... *H01Q 1/1235* (2013.01); *H01Q 1/081* (2013.01); *F16M 11/00* (2013.01)

(58) Field of Classification Search
CPC ....... H01Q 1/1235; H01Q 1/081; F16M 11/00
USPC ....................................................... 248/161
See application file for complete search history.

(56) References Cited

U.S. PATENT DOCUMENTS

| 3,276,025 | A | * | 9/1966 | Ikrath | H01Q 13/24 343/765 |
| 3,278,938 | A | * | 10/1966 | Rosenthal | H01Q 1/081 52/2.22 |
| 5,132,696 | A | * | 7/1992 | Cobb | H01Q 1/34 343/709 |
| 2012/0128905 | A1 | * | 5/2012 | Troi | B32B 1/08 428/36.1 |
| 2014/0261843 | A1 | * | 9/2014 | Graham | B29C 53/48 138/125 |
| 2020/0247564 | A1 | * | 8/2020 | Villemain | B64G 1/22 |

* cited by examiner

*Primary Examiner* — Muhammad Ijaz
(74) *Attorney, Agent, or Firm* — Oblon, McClelland, Maier & Neustadt, L.L.P.

(57) ABSTRACT

Inflatable support structures and related systems are disclosed. An example antenna system includes a mast configured to support an antenna member. The mast includes a strength member including an inner space that extends along an axis. The strength member is changeable between a first state in which the strength member is rollable along the axis and a second state in which the strength member is rigid along the axis. The mast also includes a sleeve arranged along an outer portion of the strength member. The mast also includes a bladder disposed in the inner space of the strength member and configured to receive a fluid. The first state and the second state of the strength member are based on a fluid pressure in the bladder.

20 Claims, 17 Drawing Sheets

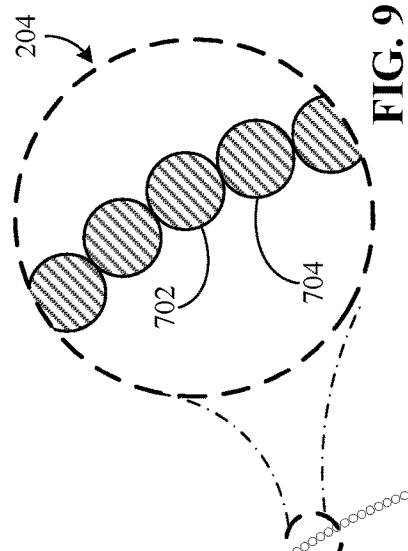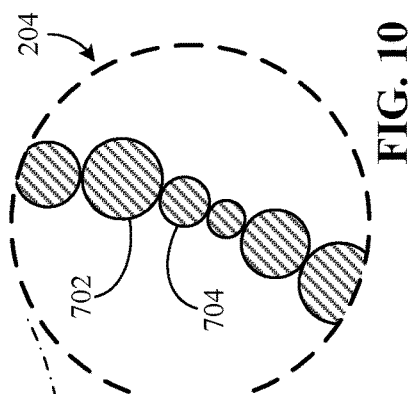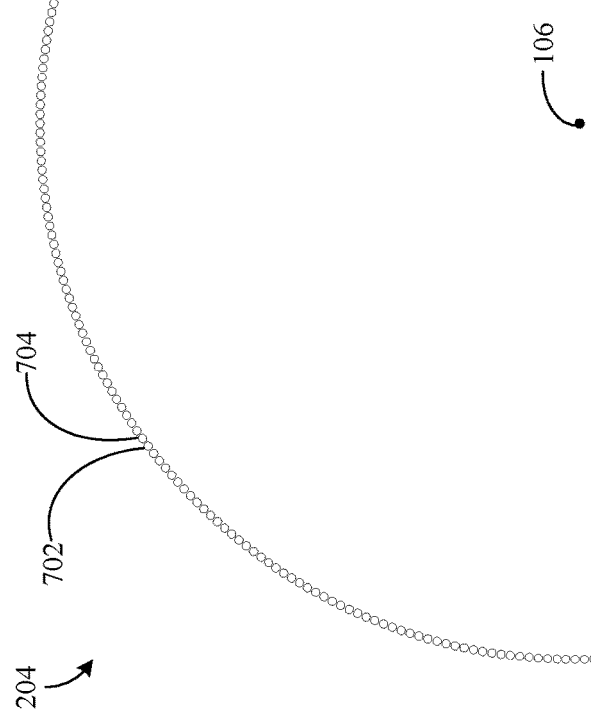

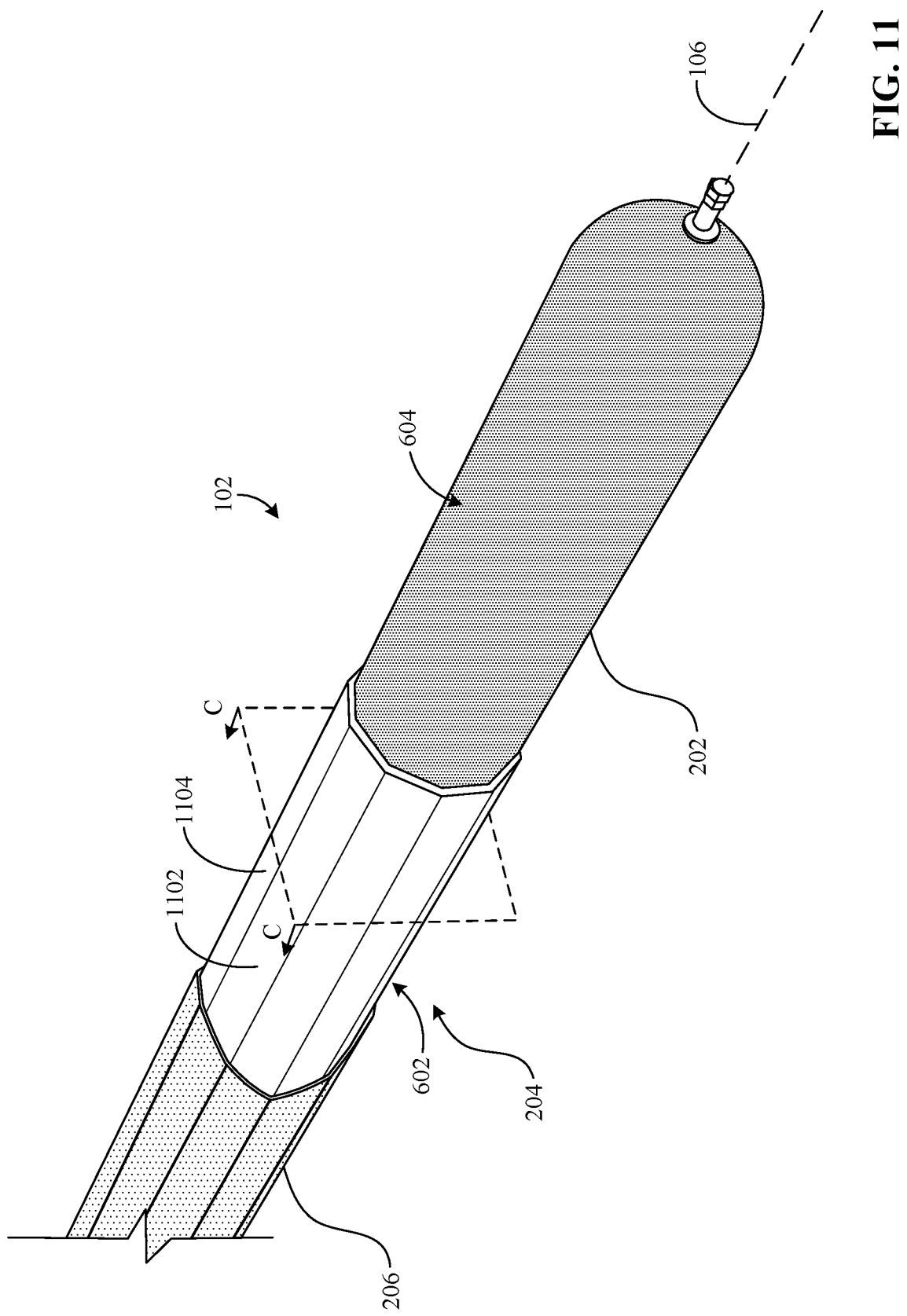

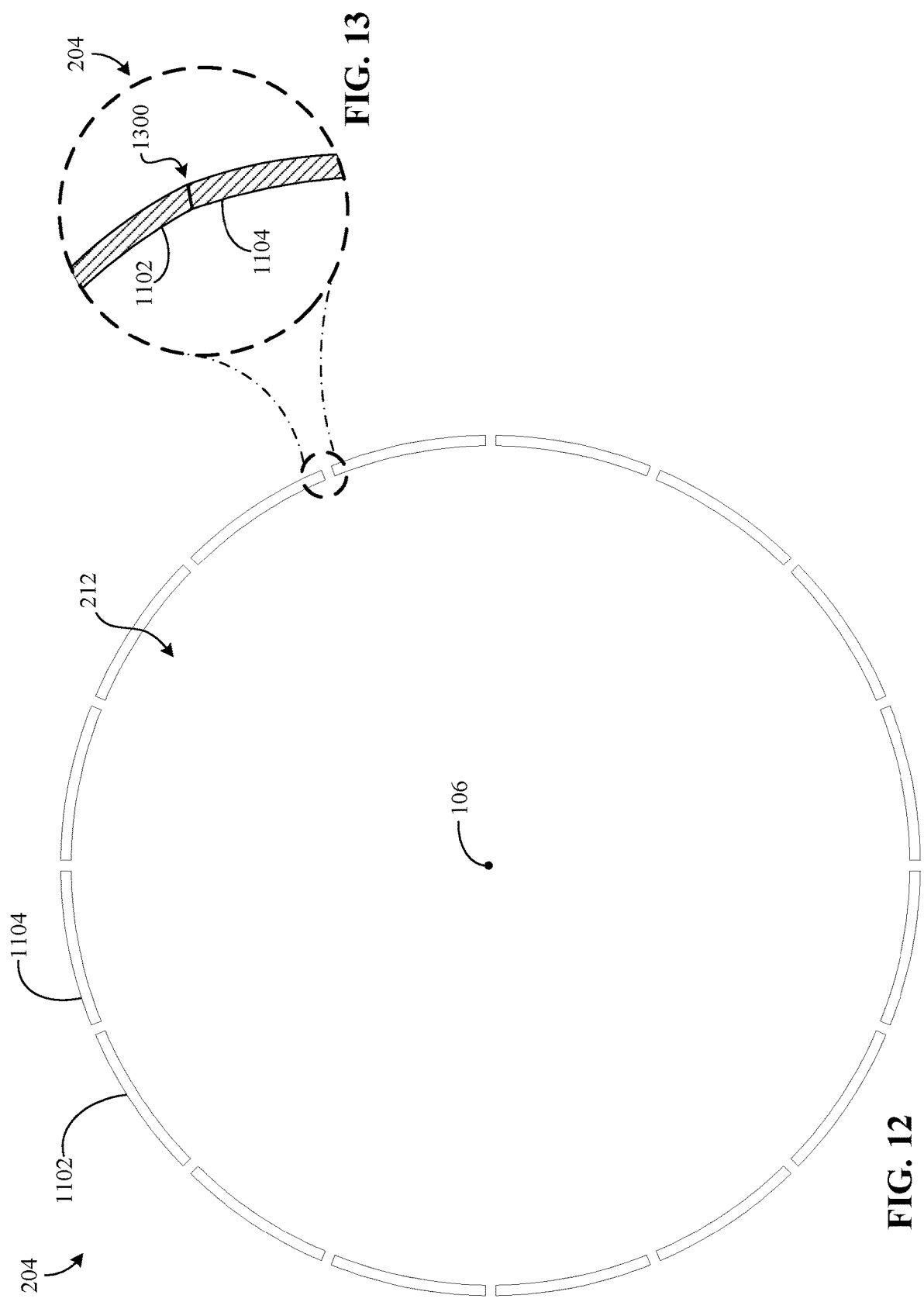

INFLATABLE SUPPORT STRUCTURES AND RELATED SYSTEMS

FIELD OF THE DISCLOSURE

This disclosure relates generally to supports and, more particularly, to inflatable support structures and related systems.

BACKGROUND

Supports are utilized in a wide-range of applications. For example, an antenna system may employ a mast configured to carry a payload such as an antenna or related components. Some supports are portable and can be deployed by one or more users to provide support to the payload at a desired location.

SUMMARY

An example antenna system includes a mast configured to support an antenna member. The mast can include a strength member having an inner space that extends along an axis. The strength member can be changeable between a first state in which the strength member is rollable along the axis and a second state in which the strength member is rigid along the axis. The mast can also include a sleeve arranged along an outer portion of the strength member. Further, a bladder can be disposed in the inner space of the strength member that is configured to receive a fluid. The strength member can be changed between the first state and the second state by varying a fluid pressure in the bladder.

An exemplary inflatable support structure can also include an inner layer defining a fluid chamber that extends along an axis. An outer layer can extend over the inner layer and an intermediate layer can be interposed between the inner and outer layers to resist a compressive load applied to an end of the intermediate layer. The inner layer, when inflated, is configured to urge the intermediate layer into engagement with the outer layer to increase a rigidity of the intermediate layer along the axis. The outer layer is configured to limit expansion of the intermediate layer in a radially outward direction relative to the axis.

An exemplary deployable support structure can include a tubular body having a cross-sectional area that defines an inner space extending along an axis. The deployable support structure includes a bladder extending through the inner space and configured to expand or contract to change a shape of the cross-sectional area. A rigidity of the tubular body is based at least partially on a shape of the cross-sectional area and a fluid pressure in the bladder. The tubular body is rigid along the axis when the fluid pressure is above a first threshold and rollable along the axis when the fluid pressure is below a second threshold.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is a cross-sectional view of the exemplary intermediate layer taken along plane B-B of FIG. 7;

FIGS. 9 and 10 are enlarged partial views of the exemplary intermediate layer of FIG. 8;

FIG. 11 is another partial view of an exemplary inflatable support structure and shows part of an example intermediate layer in accordance with the teachings of this disclosure;

FIG. 12 is a cross-sectional view of the exemplary intermediate layer taken along plane C-C of FIG. 11;

FIG. 13 is an enlarged partial view of the exemplary intermediate layer of FIG. 12;

The figures are not to scale. In general, the same reference numbers will be used throughout the drawing(s) and accompanying written description to refer to the same or like parts.

DETAILED DESCRIPTION

Figure 1:
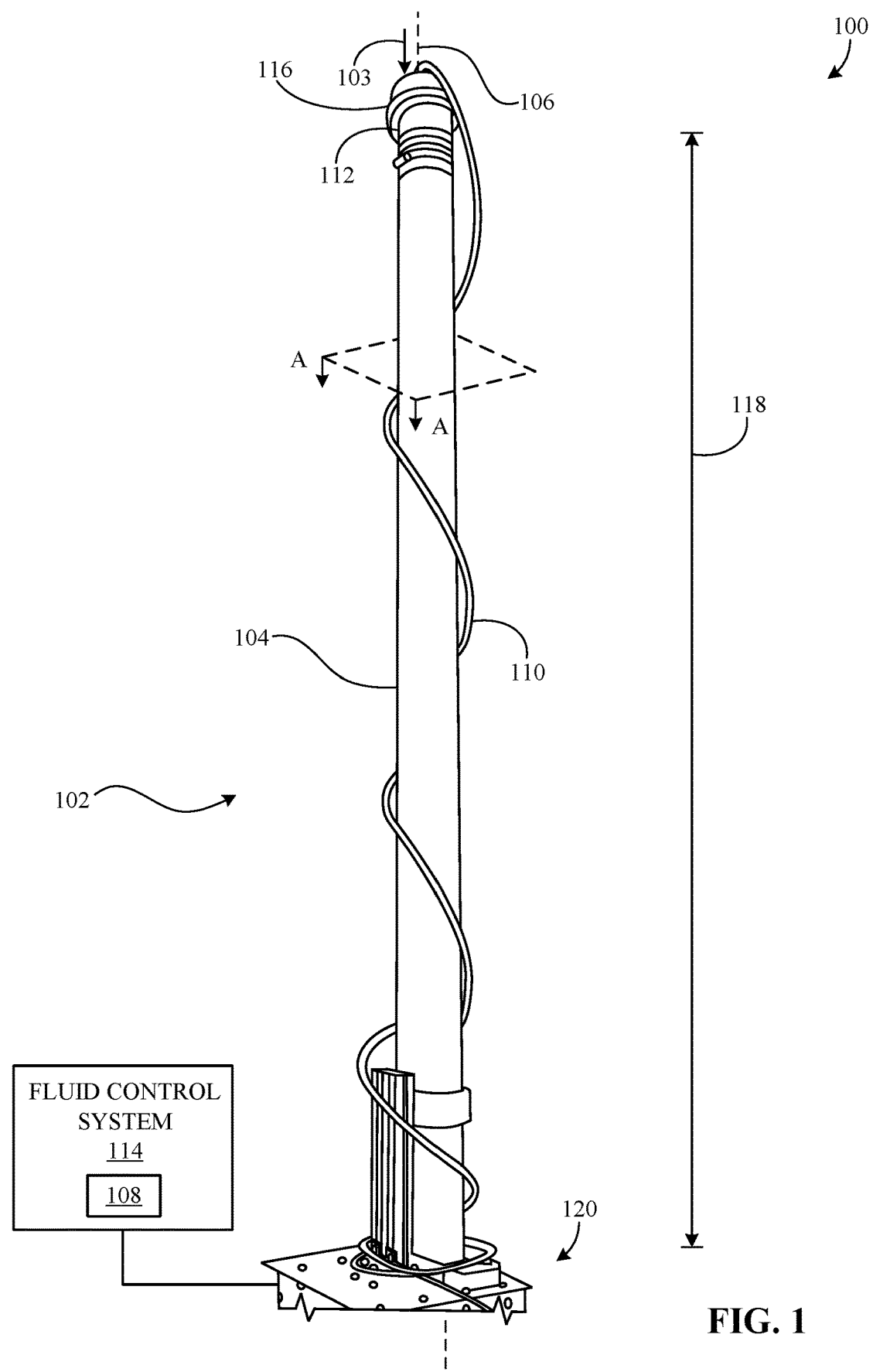
FIG. 1 is a schematic illustration of an exemplary system in which examples disclosed herein can be implemented.

In antenna applications, sensing and communicating beyond threat range and beyond line of sight (LOS) are critical capabilities for command and control operations. Portable mast or extendable antenna solutions are often heavy, large, costly, or difficult and slow to deploy, negatively impacting the operations for which they are a part. Extendable masts can be roughly categorized as: (1) masts that telescope and rely on high-strength materials to support their payload; and (2) masts that roll but rely on stays to support their payload. Such masts attempt to satisfy the required ease of assembly, compatibility, weight, footprint, and stiffness while balancing the cost of the system. The payload capacity and extended height are a tradeoff that is limited by the stiffness of the mast. Some extendable masts for field operations are both lightweight and compact but have long assembly times and wide footprints relative to other systems. Some masts that are designed to break into small segments can extend to 40 feet (ft) in height, and weigh less than 50 pounds (lb). However, such a mast can only support light payloads and requires at least two users over 15 minutes to assemble. To reduce the setup time, other extendable masts can use a rolled bistatically stable slit tube. Both systems use stays that extend as much as 25 ft from the base. The stays are staked into the ground or otherwise secured which can be difficult if not impossible in dense urban, rocky, or soft sandy terrain, limiting the use of these masts.

Additionally, other free-standing masts can be extended quickly and automatically and are stiff enough to carry payloads of several hundred pounds at heights beyond 60 ft. These systems, however, are large and heavy. Such systems typically require a dedicated vehicle or trailer for transportation and a pneumatic system for deployment. These masts are typically found on mobile television crew vans for live reporting and on many military vehicles including Humvees, tanks, and amphibious craft. There are free-standing extendable masts that are compact and light, but costly high strength-to-weight ratio materials are needed to obtain the necessary stiffness for a useable length system. Further, rollable, extendable booms can use a custom composite construction, however, they are limited to 3-15 ft long and are typically used in weight/space critical applications, such as the space industry.

The above masts are typically implemented using tubes. These tubes fall into four categories: 1) rigid or telescoping, 2) slit tube, 3) fully inflatable, and 4) hybrid; the failure modes differ slightly for each category. For a rigid or telescoping tube, the main failure mode is eccentric column buckling, which is highly dependent on a ratio of a length of the tube to a diameter of the tube. If the tube is too long, the tube cannot support a payload at an end of the tube, which is why rigid or telescoping tubes are often stayed to effectively shorten their length. Slit tubes are nearly as strong as rigid tubes in pure compression, with the advantage of being able to be rolled up when not in use. However, away from pure compression, slit tubes fail in a mode sometimes referred to as free-edge buckling, in which a local buckling failure along the free edge of the slit tube radiates along the lengthwise free edges of the tubes, causing total failure. To mitigate this, slit tubes are often doubled up, with one inside the other, or stayed at numerous points along their length. Stays are also necessary to prevent eccentric column buckling if the tube gets too long. Further, fully-inflatable tubes are extremely light and very compact when stowed. When inflated to high air pressure, they can support some load in pure compression, but typically fail due to the onset of wrinkling in the fabric. This wrinkle moves the part away from pure compression leading to catastrophic failure. Fabric tubes are also strong when used as arches to resist a simply supported load. These arches can be designed, at high air pressure, to support loads similar to vertical tubes, but require a much larger staging area.

Hybrid tubes are also very compact when stowed, like inflatables and slit tubes, but away from pure compression have greater strength than that of slit tubes and rigid tubes. Hybrid tubes mitigate free-edge buckling by spreading the shear strain at the free edges of the strength members along the whole length, which permits the use of discrete strength members that are cheap, easy to manufacture, and easy to roll and that provide strength comparable to larger, more expensive options. When a hybrid tube fails, it does so in uniform loading failure that is much higher than the eccentric column buckling failure of tubes and slit tubes. For applications where small stowage size, low weight, moderate payload, and small staging area are required, hybrid tubes are a logical choice. Payload factor, a nondimensional metric that relates stowed size and weight with deployed size and payload, is greatest for hybrid tubes, under different constraints, as compared with other options.

The typical beam equation for critical buckling load at the end of a simply-supported beam is shown below in Eq. (1):

$$P_{crit} = \frac{\pi^2 EI}{2(L/r)^2} \tag{1}$$

In Eq. (1) above, $P_{crit}$ is a critical load, E is a modulus of elasticity of the beam, I is a moment of inertia of the beam, L is a length of the beam, and r is a depth of the beam. In typical masts, there are two ways to increase a critical load of the mast without risking buckling. First, the product EI of the part, which is proportional to its bending stiffness, can be increased. This requires either an improvement in a material of the mast to increase modulus of elasticity, or an increase in the diameter to increase the moment of inertia about the mast's neutral axis. Second, the effective length of the mast can be reduced, as with typical rollable masts that require a large number of stays along their length. These stays effectively reduce the unsupported length (L in the equation) to reduce deflection.

Aspects of the disclosure provide inflatable support structures and related systems. Disclosed examples advantageously utilize a combination of technologies to provide one or more exemplary inflatable support structures (e.g., hybrid masts such as low-pressure inflatable girder (L-PIG) masts) that are both stable and rapidly-deployable. The disclosed inflatable support structures are lightweight structures that use fluid pressure (e.g., a relatively low-pressure air) to prevent buckling from occurring. The fluid pressure provides the stability traditionally provided by the lattice structure of cross-beams in a framework girder, but at much lower weight and reduced structural complexity. In some examples, a disclosed inflatable support structure includes an inner layer (e.g., an elastic bladder), an intermediate layer (e.g., a rollable strength member), and an outer layer (e.g., a fabric sleeve or sock) arranged along an outer portion of the intermediate layer. The intermediate layer is interposed between the inner and outer layers. In particular, the disclosed intermediate layer is configured to change between a first state (e.g., a flexible state) in which the intermediate layer is rollable along an axis and a second state (e.g., a rigid state) in which the intermediate layer is rigid along the axis. The first and second states of the intermediate layer are based on a fluid pressure in the inner layer. That is, the disclosed intermediate layer, which is inherently rollable, can be made to act like a rigid tube if the intermediate layer is backed by moderate fluid pressure and constrained in the outer layer.

In some examples, the disclosed intermediate layer includes a single member (e.g., a slit tube) that is bistatically. Alternatively, in some examples, the disclosed intermediate layer includes a plurality of members (e.g., longitudinal members) radially distributed relative to the axis, which reduces costs associated with producing the inflatable support structure. In such examples, the plurality of members include, but are not limited to, threads, sheets, tubes, rods, slats, and the like, including any other suitable longitudinal member(s), or a combination thereof. In any case, when the intermediate layer is backed with a certain fluid pressure (e.g., a moderate air pressure), an overall stiffness of the intermediate layer becomes dependent upon the fluid pressure rather than a length of the intermediate layer. As a result, the intermediate layer can have a relatively small diameter while still supporting a relatively large payload. In particular, backing the disclosed intermediate layer with the inner layer at moderate pressure changes the critical load equation, as shown below in Eq. (2):

$$P_{crit} = \frac{8}{L/r}\sqrt{\frac{\pi pEI}{2}} \quad (2)$$

In Eq. (2) above, as before, the critical load is $P_{crit}$, E is the modulus of elasticity, and I is the moment of inertia. However, fluid pressure, p, is introduced in the equation, as well as the nondimensional factor $\gamma$. As shown, the critical load $P_{crit}$ is inversely proportional to length and directly proportional to fluid pressure. By adding this direct proportionality with the square root of fluid pressure, and by reducing the inverse proportionality from length squared to length, a disclosed inflatable support structure can be made stronger than a known rolled mast by adding increased fluid pressure. Under moderate fluid pressure, the failure mode of the intermediate layer is akin to uniform loading along the length of a tube. This enables disclosed designs to avoid the failure modes that typically cause buckling in long slender parts.

Thus, disclosed examples provide a versatile and cost-effective solution based on inflatable technology. Compared with the above-mentioned known mast designs, the disclosed inflatable support structures are more compact when stowed, have increased deployed payload heights, and are easier and faster for human operators to use.

The disclosed inflatable support structures can be advantageously utilized in a wide-rand of applications. In antenna applications where getting up above a tree line is critical, a disclosed inflatable support structure can be used to support an antenna member at an elevated position, which improves wireless communications. For example, a disclosed inflatable support structure can be implemented in a robotic vehicle needing to communicate. Further, in some examples, one or more of the disclosed inflatable support structures can be rapidly deployed during a disaster scenario, for example, to serve as temporary telephone pole(s). Further, in some examples, the disclosed inflatable support structures can be used in connection with setting up temporary shelters, camouflaged netting, and the like. Further still, in construction applications, one or more of the disclosed inflatable support structures can be deployed (e.g., temporarily) to support a platform, a mold bladder, and the like.

Figure 2:
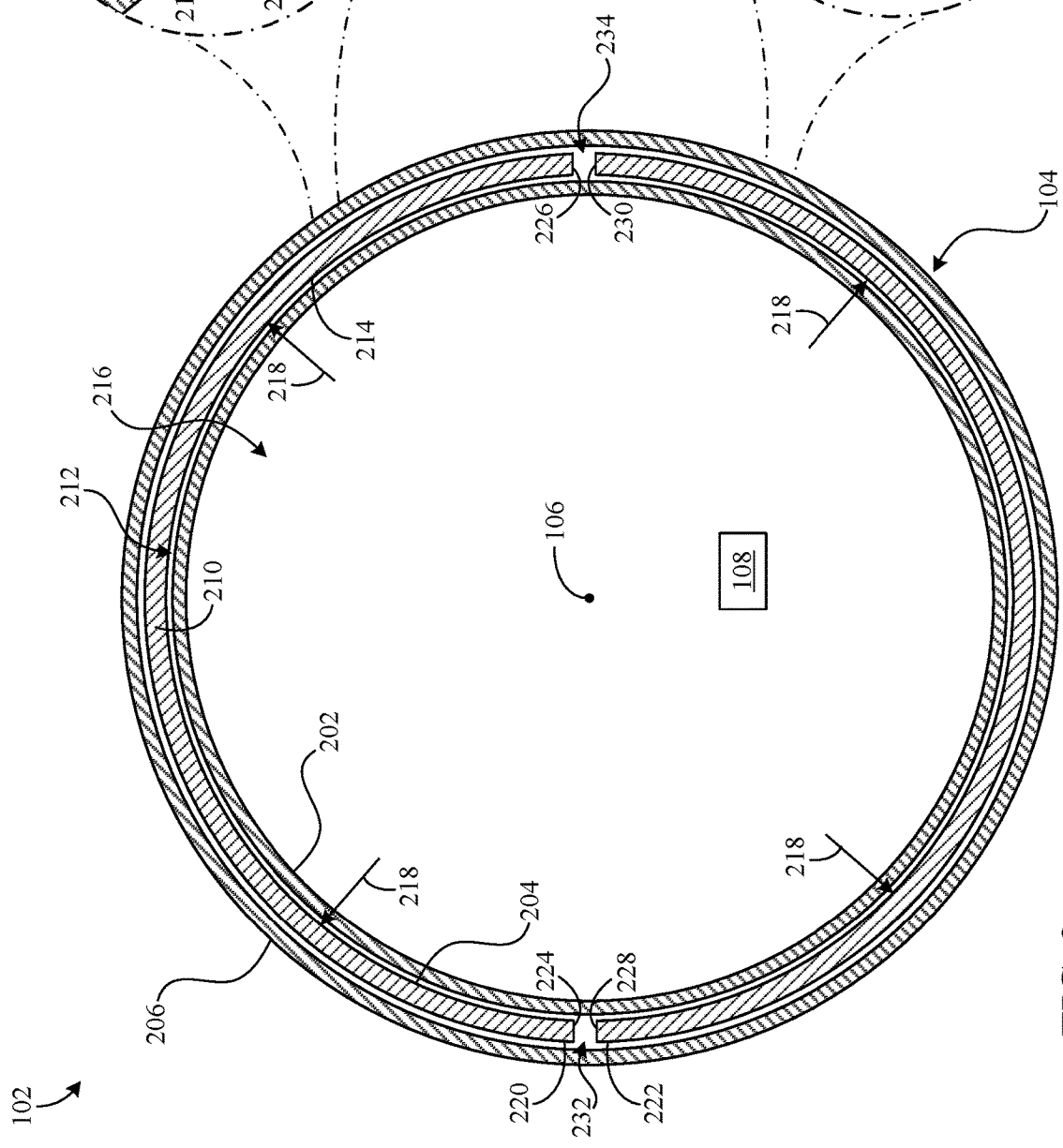
FIG. 2 is a cross-sectional view of an exemplary inflatable support structure in accordance with the teachings of this disclosure.

FIG. 1 is a schematic illustration of an exemplary system (e.g., a line of sight antenna system) 100 in which examples disclosed herein can be implemented. According to the illustrated example of FIG. 1, the system 100 includes an example support structure 102 that is inflatable and/or configured to inflate, which is sometimes referred to as an inflatable support structure. In some examples, the support structure 102 of FIG. 1 includes a mast (e.g., a hybrid mast) such as, for example, an L-PIG mast. In particular, the support structure 102 of FIG. 1 is configured to be substantially rigid when the support structure 102 is sufficiently inflated (as shown in FIG. 2), which allows the support structure 102 to resist a load (e.g., a compressive load) 103. In some examples, the support structure 102 is configured to hold and/or support a mass at an elevated position such as, for example, an antenna member of the system 100. Further, the support structure 102 of FIG. 1 is also configured to be substantially flexible and/or malleable when the support structure 102 is sufficiently deflated (e.g., see FIG. 5), which allows for efficient and/or compact storage of the support structure 102. As will be discussed further below, the support structure 102 of FIG. 1 can be manipulated (e.g., rolled) when sufficiently deflated.

According to the illustrated example of FIG. 1, the support structure 102 includes a primary body (e.g. a tubular body) 104 extending along an axis (e.g., a longitudinal axis) 106 of the support structure 102. In particular, the primary body 104 of FIG. 1 is backed by a fluid pressure inside a fluid chamber 216 (shown in FIG. 2) of the support structure 102 that is internal to the primary body 104 and extends along the axis 106. To facilitate controlling rigidity and/or compressive strength of the support structure 102, a fluid 108 can be provided to the fluid chamber 216 of the support structure 102. In some examples, the system 100 also includes an example fluid line (e.g., tubing) 110 through which the fluid 108 is conveyable. As shown in FIG. 1, the support structure 102 includes a first end (e.g., a load bearing end) 112 that is configured to receive the fluid line 110, for example, at an opening 606 (shown in FIG. 6) positioned at or adjacent the first end 112. The fluid line 110 of FIG. 1 extends alongside the primary body 104 of the support structure 102 away from the first end 112. As shown in FIG. 1, the fluid line 110 can be coiled around the primary body 104.

Additionally, in some examples, the system 100 of FIG. 1 also includes an example fluid control system 114 that can be configured to inflate and/or deflate the fluid chamber 216 with a fluid, such as air. The fluid control system 114 can be fluidly coupled to the fluid chamber 216 of the support structure 102 via the fluid line 110. The fluid control system 114 includes one or more fluid control devices operable to change one or more parameters (e.g., a fluid pressure, a flow rate, etc.) of the fluid 108. For example, the fluid control device(s) of the fluid control system 114 include any one or more of a compressor, a pump, a fluid valve, a fluid reservoir, and the like, or a combination thereof. In such examples, the fluid line 110 of FIG. 1 is fluidly coupled to at least one of the fluid control device(s) of the fluid control system 114 to receive the fluid 108 from the fluid control device(s). In particular, the fluid control system 114 of FIG. 1 is configured to pump the fluid 108 through the fluid line 110 into the fluid chamber 216, thereby inflating the support structure 102.

Additionally, in some examples, the support structure 102 includes one or more (e.g., two) example caps (e.g., end caps) 116 coupled to the primary body 104, one of which is shown in this example (i.e., a first cap 116). As shown in FIG. 1, the first cap 116 is coupled to the first end 112 of the support structure 102, for example, via one or more fasteners and/or one or more fastening methods or techniques. In such examples, the first cap 116 is configured to constrain the support structure 102 to prevent expansion along a length (e.g., an inflated length) 118 of the support structure 102 so that the fluid pressure in an inner layer 202 (shown in FIG. 2) is uniform.

In some embodiments, the support structure 102 of FIG. 1 is extendable. For example, the length 118 of support structure 102 can increase by further inflating the support structure 102. Conversely, in some embodiments, the support structure 102 of FIG. 1 is retractable. For example, the length 118 of the support structure 102 can decrease by deflating the support structure 102. Accordingly, in such examples, the support structure 102 of FIG. 1 is also configured to deflate. In any case, to assist one or more users in adjusting the length 118, the system 100 of FIG. 1 also includes an example adjuster mechanism 120 that is operatively coupled to the support structure 102. In particular, the adjuster mechanism 120 of FIG. 1 is configured to roll and/or unroll at least a portion of the primary body 104, thereby changing the length 118, as will be discussed further below in connection with FIG. 16.

Although FIG. 1 depicts a single support structure 102, in some examples, the system 100 is implemented using a plurality of support structures 102 to provide support to one or more masses. In such examples, the plurality of support structures 102 may be provided with adjuster mechanisms 120.

FIG. 2 is a cross-sectional view of the support structure 102 taken along plane A-A of FIG. 1. According to the illustrated example of FIG. 2, the support structure 102 includes an example inner layer (e.g., a bladder) 202, an example intermediate layer (e.g., a strength member) 204, and an example outer layer (e.g., a sleeve) 206. As shown in FIG. 2, the intermediate layer 204 includes a first cross-sectional area 210 having a shape (e.g., a substantially circular shape) associated with a rigidity and/or compressive strength of the intermediate layer 204, which may be uniform across the length 118 of the support structure 102. The rigidity and/or compressive strength of the intermediate layer 204 is/are based at least partially on the shape of the first cross-sectional area 210 as well as a pressure of the fluid 108 in the inner layer 202. In particular, the outer layer 206 and the inner layer 202, together, are configured to control the shape of the first cross-sectional area 210 via the fluid 108.

The intermediate layer 204 of FIG. 2 facilitates providing structural integrity to the support structure 102 and is sometimes referred to as a strength member. The intermediate layer 204 includes an inner space (e.g., a pocket or cavity) 212 that extends along the axis 106. For example, an inner surface (e.g., an inner circumferential surface) 214 of the intermediate layer 204 forms and/or defines the inner space 212. In particular, the intermediate layer 204 is changeable between a first state (e.g., a flexible state) in which the intermediate layer 204 is rollable along the axis 106 and a second state (e.g., a rigid state) in which the intermediate layer 204 is rigid along the axis 106. In other words, the intermediate layer 204 of FIG. 2 is configured to change between two different states. According to the illustrated example of FIG. 2, the intermediate layer 204 of FIG. 2 is in the second state thereof and resisting the load 103. The load 103 may be applied to an end 1401 (shown in FIG. 14) of the intermediate layer 204 that corresponds to the first end 112 of the support structure 102. Additionally, the intermediate layer 204 of FIG. 2 is also configured to resist a bending moment associated with the load 103.

The intermediate layer 204 can be constructed of one more materials having suitable mechanical properties such as, for example, any of aluminum, fiberglass, steel, carbon fiber, and the like, or a combination thereof. Additionally or alternatively, in some examples, the intermediate layer 204 is constructed of one or more composites configured to change state based on temperature. In such examples, the composite(s) harden when a temperature of the composite(s) is above a threshold temperature, thereby increasing the rigidity and/or compressive strength of the intermediate layer 204. Conversely, in such examples, the composite(s) soften when the temperature of the composite(s) is below the threshold temperature, thereby decreasing the rigidity and/or compressive strength of the intermediate layer 204.

The inner layer 202 of FIG. 2 facilitates backing the intermediate layer 204 with pressure. As shown in FIG. 2, the inner layer 202 extends continuously around the axis 106. According to the illustrated example of FIG. 2, the inner layer 202 defines a fluid chamber (e.g., a substantially sealed chamber) 216 configured to receive the fluid 108. In some examples, the inner layer 202 is a bladder. In such examples, the inner layer 202 is substantially stretchable and/or elastic. That is, the inner layer 202 has a relatively low hoop stiffness. For example, the inner layer 202 is expandable in a radially outward direction during inflation of the inner layer 202. The inner layer 202 of FIG. 2 can be constructed of, for example, polyurethane and/or any other material(s) having suitable elastic parameter(s). In particular, the first state and the second state of the intermediate layer 204 are based on a fluid pressure in the inner layer 202 (i.e., a pressure of the fluid 108).

In some examples, the inner layer 202 is configured to inflate to provide the second state of the intermediate layer 204. In particular, the fluid pressure in the inner layer 202 of FIG. 2 is above a first threshold fluid pressure (e.g., a value corresponding to a fluid pressure), which urges the inner layer 202 radially outward relative to the axis 106 toward the intermediate layer 204. The first threshold fluid pressure is, for example, substantially 5 pound per square inch (PSI). According to the illustrated example of FIG. 2, the fluid 108 applies one or more forces (e.g., radial forces) 218 to the intermediate layer 204 directed in a radially outward direction. Further, as a result of such fluid pressure in the inner layer 202, the inner layer 202 of FIG. 2 urges the intermediate layer 204 radially outward relative to the axis 106 toward the outer layer 206 and into engagement with the outer layer 206. In this manner, disclosed examples back the intermediate layer 204 with pressure, thereby substantially reducing and/or eliminating stress concentrations in the intermediate layer 204. In such examples, when the fluid 108 is a compressible fluid such as a gas, the fluid 108 effectively distributes the pressure in response to a bend forming on the intermediate layer 204. On the other hand, in some examples, the inner layer 202 of FIG. 2 is configured to deflate to provide the first state of the intermediate layer 204, as discussed further below in connection with FIG. 5.

The fluid 108 of FIG. 2 facilitates expansion of the inner layer 202. According to one or more disclosed examples, the fluid 108 can be implemented using one or more compressible fluids and/or one or more incompressible fluids. In some examples, the fluid 108 of FIG. 2 includes one or more gases (e.g., air), one or more liquids (e.g., water), any other suitable fluid(s) or a combination thereof.

The outer layer 206 of FIG. 2 facilitates limiting expansion of the intermediate layer 204. As shown in FIG. 2, the outer layer 206 of FIG. 2 surrounds the intermediate layer 204 and extends continuously around the axis 106. In some examples, the inner layer 202 is a sleeve (e.g., a braided sleeve) such as, for example, a sock. In such examples, the outer layer 206 has a relatively high hoop stiffness compared to the inner layer 202. For example, in FIG. 2, an internal structure of the outer layer 206 is configured to prevent the outer layer 206 from expanding radially outward relative to the axis 106. In particular, the outer layer 206 is configured to constrain the intermediate layer 204 while the inner layer 202 urges the intermediate layer 204 radially outward relative to the axis 106. In some examples, the inner layer 202 and the outer layer 206, together, are configured to maintain the shape of the first cross-sectional area 210 while the fluid pressure in the inner layer 202 is at or above the first threshold fluid pressure. As shown in FIG. 2, the first cross-sectional area 210 (i.e., a cross-sectional shape of the intermediate layer 204) is substantially circular. That is, in some examples, a circularity of the first cross-sectional area 210 is between 1.0 and 0.94.

Although FIG. 2 depicts the first cross-sectional area 210 of the intermediate layer 204 that is substantially circular, in some examples, the support structure 102 is implemented differently. For example, any of the intermediate layer 204, the outer layer 206, and/or the inner layer 202 can be sized, shaped, structured, and/or configured differently to provide a different shape of a the first cross-sectional area 210 that is non-circular while still providing sufficient support to the load 103.

In some examples, the intermediate layer 204 is segmented, which reduces costs associated with producing the intermediate layer 204. In such examples, the intermediate layer 204 includes a first plurality of members (e.g., longitudinal members) 220, 222, two of which are shown in this example. That is, the intermediate layer 204 of FIG. 2 includes a first member (e.g., a first longitudinal member) 220 and a second member (e.g., a second longitudinal member) 222. The first member 220 of the intermediate layer 204 and the second member 222 of the intermediate layer 204 are positioned adjacent each other to provide the inner space 212 between the first and second members 220, 222. In some examples, each of the first plurality of members 220, 222 is bistatically stable. As shown in FIG. 2, each of the first plurality of members 220, 222 of FIG. 2 has a cross-sectional area that is substantially semi-circular. According to the illustrated example of FIG. 2, the first plurality of members 220, 222 includes sheets (e.g., fabric sheets). However, in some examples, at least some or all of the first plurality of members 220, 222 are implemented differently. Although FIG. 2 depicts the intermediate layer 204 being segmented, in some examples, the intermediate layer 204 is implemented using a single member (e.g., a slit tube) alternatively to the first plurality of members 220, 222. In such examples, the single member of the intermediate layer 204 is bistatically stable.

The first member 220 of FIG. 2 includes edges (e.g., opposite edges) 224, 226 that face respective edges (e.g., opposite edges) 228, 230 of the second member 222. As shown in FIG. 2, the edges 224, 226 of the first member 220 are spaced from the respective edges 228, 230 of the second member 222 such that gaps or slits 232, 234 exist between adjacent ones of the edges 224, 226, 228, 230. In other words, the intermediate layer 204 of FIG. 2 includes one or more slits 232, 234 positioned thereon and extending across a length of the intermediate layer 204, two of which are shown in this example (i.e., a first slit 232 and a second slit 234). The slit(s) 232, 234 of intermediate layer 204 facilitate(s) folding the intermediate layer 204 and/or, more generally, folding the support structure 102 when the inner layer 202 is deflated. Although FIG. 2 depicts the intermediate layer 204 having two slits 232, 234 formed by the first and second members 220, 222, in some examples, the intermediate layer 204 is implemented differently. In such examples, the intermediate layer 204 includes only one of the slits 232, 234 of FIG. 2 or one or more other slits in addition to the first and second slits 232, 234.

According to the illustrated example of FIG. 2, the intermediate layer 204 and the outer layer 206 form and/or define the primary body 104 of the support structure 102. As such, the primary body 104 of FIG. 2 includes a plurality of layers 204, 206 that are separate from each other. However, in some examples, the primary body 104 is implemented differently, for example, using a single layer that includes the intermediate layer 204 woven into the outer layer 206, as discussed further below in connection with FIG. 4.

Figure 3:
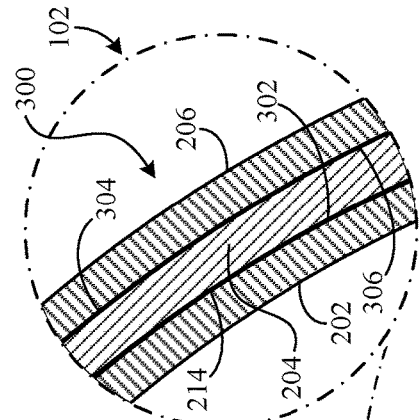
FIG. 3 is an enlarged partial view of the exemplary inflatable support structure of FIG. 2 and shows a first configuration thereof in accordance with the teachings of this disclosure.

FIG. 3 is an enlarged partial view of the support structure 102 of FIG. 2 and shows an exemplary first configuration 300. According to the illustrated example of FIG. 3, the intermediate layer 204 is interposed between the inner layer 202 and the outer layer 206. In particular, the inner layer 202 of FIG. 3 is inflated and urging at least a portion of the intermediate layer 204 into engagement with the outer layer 206 to increase the rigidity and/or compressive strength of the intermediate layer 204 along the axis 106. For example, the intermediate layer 204 of FIG. 3 is squeezed by and/or directly contacting the inner layer 202 and the outer layer 206. In some examples, no gaps exist between an outer surface 302 of the inner layer 202 and the inner surface 214 of the intermediate layer 204, as shown in FIG. 3. Further, in some examples, no gaps exist between an outer surface 304 of the intermediate layer 204 and an inner surface 306 of the outer layer 206. Such engagement associated with the inner, intermediate, and outer layers 202, 204, 206 of FIG. 3 may occur across the length 118 of the support structure 102, which improves loading capacity of the support structure 102.

Figure 4:
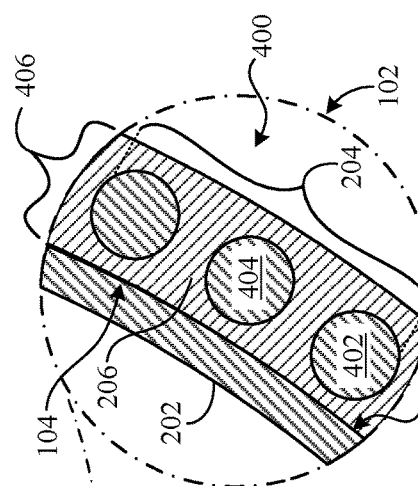
FIG. 4 is another enlarged partial view of the exemplary inflatable support structure of FIG. 2 and shows a second configuration thereof in accordance with the teachings of this disclosure.

FIG. 4 is another enlarged partial view of the support structure 102 of FIG. 2 and shows a second exemplary configuration 400. Unlike the illustrated example of FIGS. 2 and 3, the intermediate layer 204 of FIG. 4 is integral with the outer layer 206 such that the intermediate layer 204 and the outer layer 206 form a single-piece component (e.g., the primary body 104). In some examples, the intermediate layer 204 of FIG. 4 is woven into the outer layer 206. In such examples, the intermediate layer 204 of FIG. 4 includes a second plurality of members (e.g., longitudinal members) 402, 404, three of which are shown in this example. The second plurality of members 402, 404 of FIG. 4 extend through the inner layer 202 across at least part of or the entire length 118 of the support structure 102. According to the illustrated example of FIG. 4, the second plurality of members 402, 404 include threads. However, in some examples, some or all of the second plurality of members 402, 404 are implemented differently.

Additionally, in some examples, the primary body 104 of the support structure 102 of FIG. 4 includes a cross-sectional area 406 that defines the inner space 212 extending along the axis 106. In such examples, the inner layer 202 of FIG. 4 is configured to expand and/or contract, via the fluid 108, to change a shape of the cross-sectional area 406. In particular, a rigidity and/or compressive strength of the primary body 104 of FIG. 4 are based at least partially on a shape of the cross-sectional area 406 and the fluid pressure in the inner layer 202. As will be discussed further below, the primary body 104 is rigid along the axis 106 when the fluid pressure in the inner layer 202 is at or above the first threshold fluid pressure and rollable along the axis 106 when the fluid pressure in the inner layer 202 is at or below a second threshold fluid pressure (e.g., a value corresponding to a fluid pressure). The second threshold fluid pressure may be less than the first fluid pressure threshold.

Figure 5:
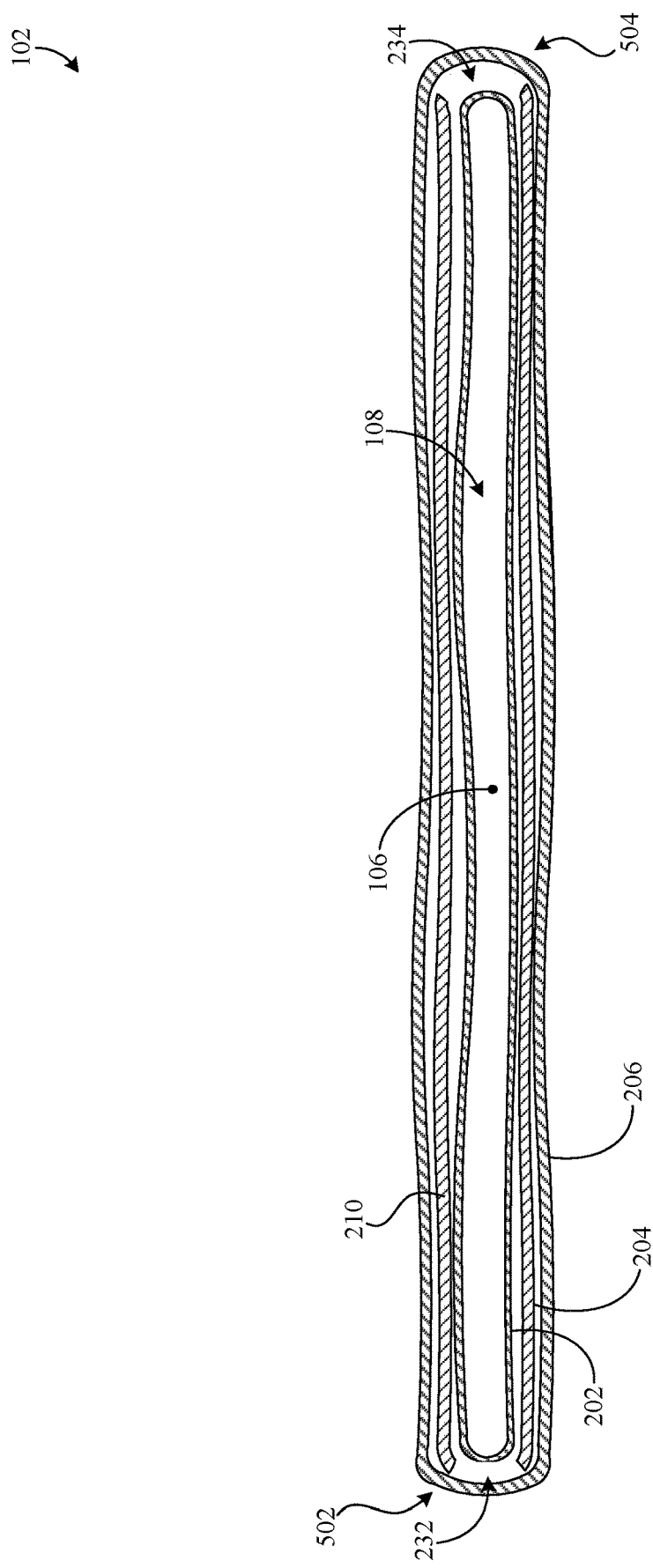
FIG. 5 is another cross-sectional view of an exemplary inflatable support structure in accordance with the teachings of this disclosure.

FIG. 5 is another cross-sectional view of the support structure 102 taken along plane A-A of FIG. 1 and shows the first state of the intermediate layer 204. Unlike the illustrated example of FIG. 2, the first cross-sectional area 210 of the intermediate layer 204 of FIG. 5 is substantially folded and/or flattened. According to the illustrated example of FIG. 5, the inner layer 202 is substantially deflated to provide the first state of the intermediate layer 204. In particular, the fluid pressure in the inner layer 202 of FIG. 5 is at or below the second threshold fluid pressure, which allows the intermediate layer 204 to substantially disengage from the inner layer 202 and/or the outer layer 206. The second threshold fluid pressure is, for example, substantially 0 PSI. For example, the pressure of the fluid 108 of FIG. 5 is equal to atmospheric pressure. Thus, in some examples, the intermediate layer 204 is not backed by any fluid pressure in the inner layer 202. In particular, as a result of such relatively low fluid pressure in the inner layer 202, each of the inner layer 202, the intermediate layer 204, and the outer layer 206 can be rolled along the axis 106 (e.g., see FIGS. 14 and 15), for example, by one or more users and/or the adjuster mechanism 120. More particularly, each of the layers 202, 204, 206 of the support structure 102 is rollable along the axis 106 while a fluid pressure in the inner layer 202 is below the second threshold fluid pressure.

In some examples, to change or transition the intermediate layer 204 from the first state thereof to the second state thereof, the fluid control system 114 is configured to change one or more parameters of the fluid 108 in the inner layer 202. For example, the fluid control system 114 is configured to pump the fluid 108 into the inner layer 202, which increases the pressure of the fluid 108 in the inner layer 202 and/or an amount of the fluid 108 in the inner layer 202. In some examples, the inner layer 202 of FIG. 5 expands in response to such fluid adjustment(s). This expansion of the inner layer 202 causes the intermediate layer 204 to similarly expand as the intermediate layer 204 transitions from the first state thereof to the second state thereof. In such examples, the outer layer 206 of FIG. 5 is configured to limit the expansion of the intermediate layer 204 in a radially outward direction relative to the axis 106.

On the other hand, in some examples, to change or transition the intermediate layer 204 from the second state thereof to the first state thereof, the fluid 108 is expelled from the inner layer 202, which decreases the pressure of the fluid 108 in the inner layer 202 and/or the amount of the fluid 108 in the inner layer 202. In such examples, the inner layer 202 of FIG. 2 contracts in response to such fluid adjustment(s). This contraction of the inner layer 202 causes the intermediate layer 204 to similarly contract as the intermediate layer 204 transitions from the second state thereof to the first state thereof.

According to the illustrated example of FIG. 5, the support structure 102 includes a first crease or fold 502 and a second crease or fold 504 that are positioned on the support structure 102 opposite relative to each other. The folds 502, 504 of the support structure 102 are substantially formed by the inner layer 202 and/or the outer layer 206 but not the intermediate layer 204. To facilitate forming the folds 502, 504, the first slit 232 of FIG. 5 is configured to be adjacent the first fold 502, and the second slit 234 of FIG. 5 is configured to adjacent the second fold 504. Further, in examples where the intermediate layer 204 includes one or more other slits in addition to the first and second slits 232, 234, at least two of the slits 232, 234 of intermediate layer 204 are positioned adjacent a respective one of the folds 502, 504 when the support structure 102 is folded.

Figure 6:
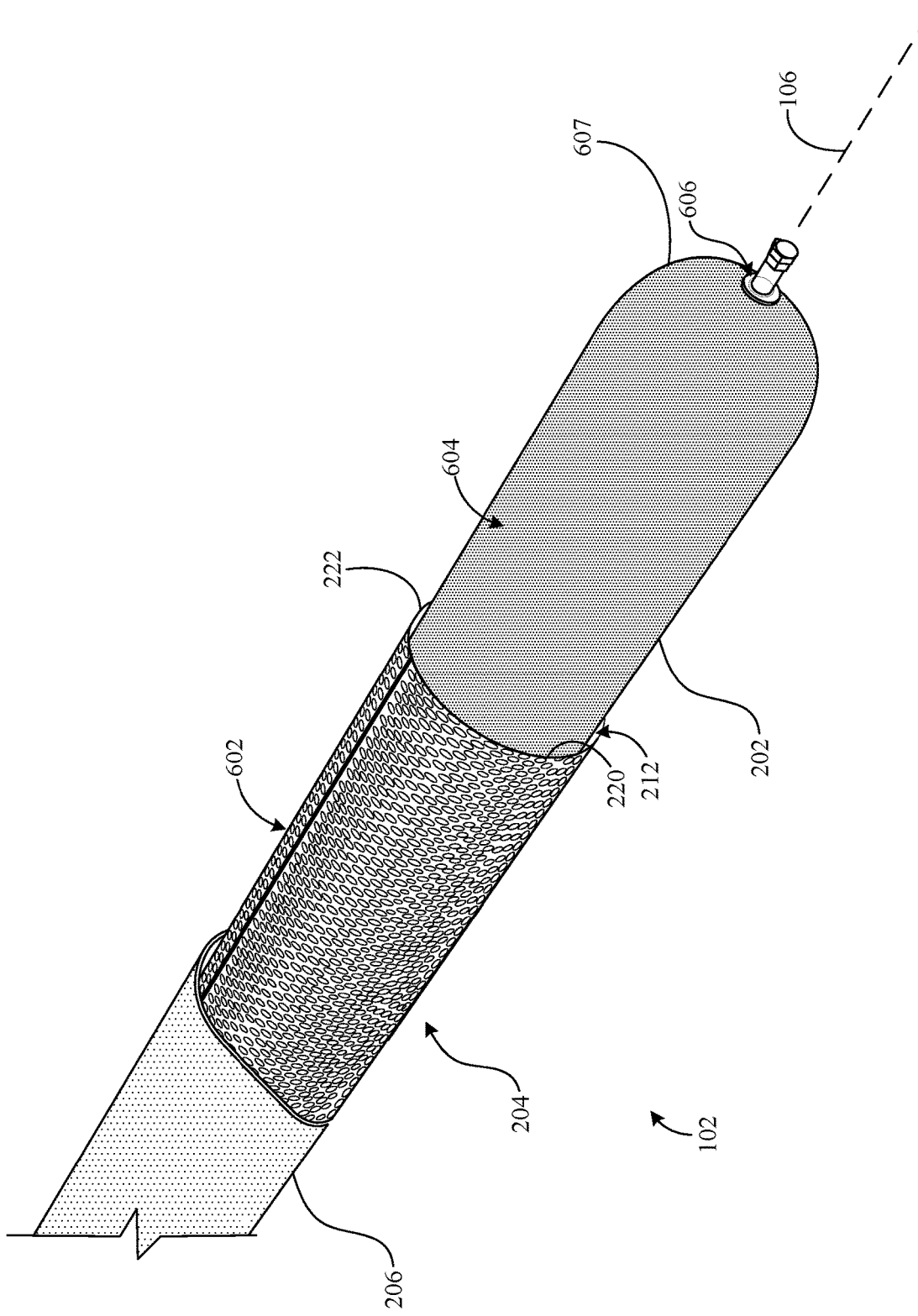
FIG. 6 is a partial view of an exemplary inflatable support structure and shows part of an example intermediate layer in accordance with the teachings of this disclosure.

FIG. 6 is a partial view of the support structure 102 of FIG. 1 and shows part of the intermediate layer 204. According to the illustrated example of FIG. 6, part of the outer layer 206 has been removed to expose an outer portion 602 of the intermediate layer 204, and part of the intermediate layer 204 has been removed to expose an outer portion 604 of the inner layer 202. The intermediate layer 204 of FIG. 6 is arranged along the outer portion 604 of the inner layer 202, and the outer layer 206 of FIG. 6 is arranged along the outer portion 602 of the intermediate layer 204. That is, the outer layer 206 of the support structure 102 extends over the intermediate layer 204 and the inner layer 202. Further, as shown in FIG. 6, each of the inner layer 202, the intermediate layer 204, and the outer layer 206 includes a tubular body extending along the axis 106. As such, in some examples, the inner layer 202 includes a first tubular body that extends alongside a second tubular body of the intermediate layer 204. Similarly, in such examples, the outer layer 206 includes a third tubular body that extends alongside the first tubular of the intermediate layer 204.

In some examples, the support structure 102 includes a first opening 606 (as represented by the dotted/dashed line of FIG. 6). The first opening 606 is positioned on the inner layer 202 at or near an end 607 of the inner layer corresponding to the first end 112 of the support structure 102. In particular, the first opening 606 extends through the inner layer 202 such that the first opening 606 is in fluid communication with the fluid chamber 216, thereby allowing the fluid 108 to flow through the first opening 606 into and/or out of the fluid chamber 216.

In some examples, to assemble the support structure 102, the intermediate layer 204 is inserted in the outer layer 206. Then, the inner layer 202 is inserted in the intermediate layer 204, for example, by pulling the first plurality of members 220, 222 through the inner space 212 of the intermediate layer 204. Further, in some examples, the intermediate layer 204 of FIG. 6 may be removed or pulled out from between the inner and outer layers 202, 206, for example, to replace the intermediate layer 204 with another or different intermediate layer.

Figure 7:
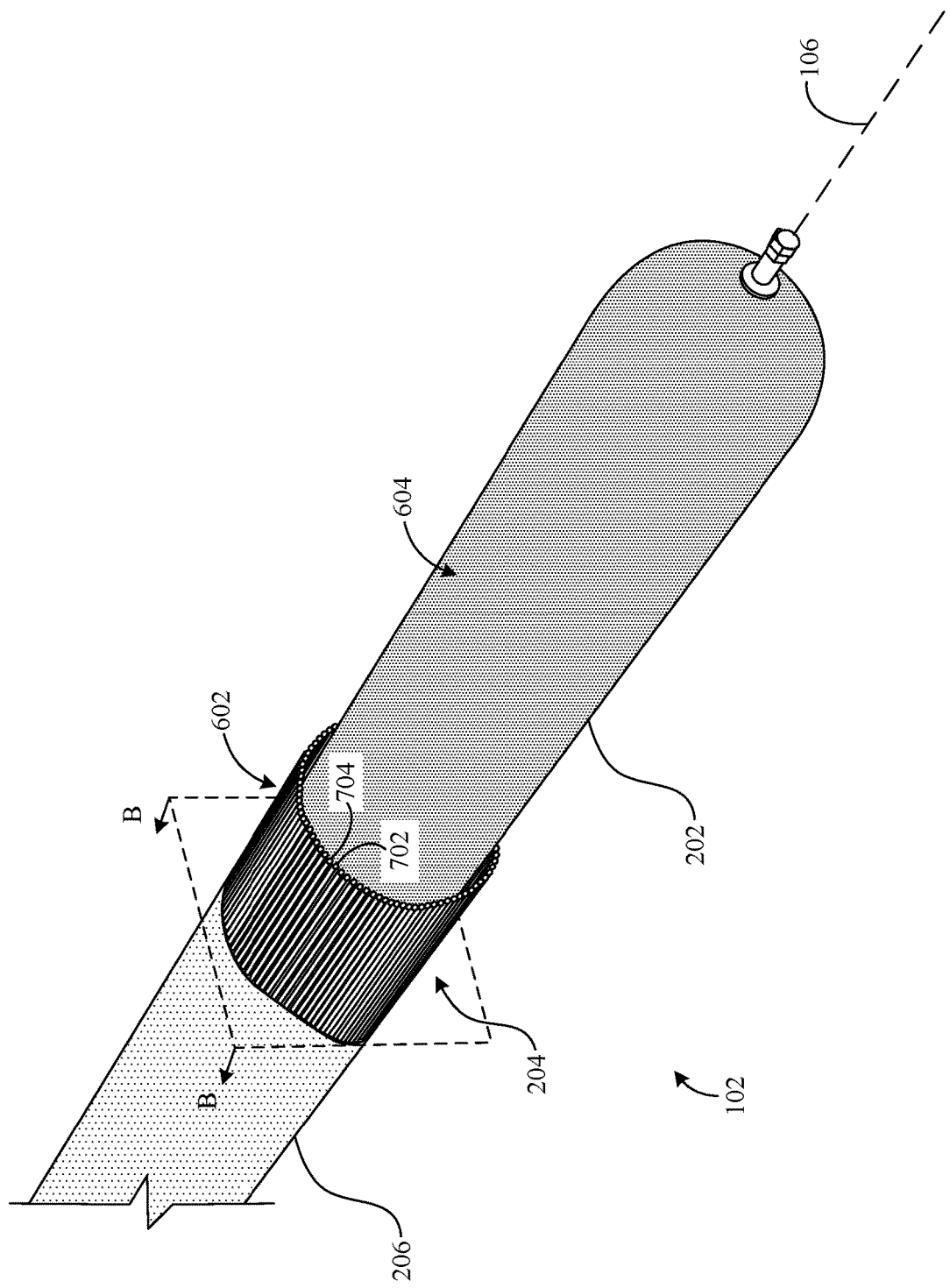
FIG. 7 is another partial view of an exemplary inflatable support structure and shows part of an example intermediate layer in accordance with the teachings of this disclosure.

FIG. 7 is another partial view of the support structure 102 of FIG. 1 and shows part of the intermediate layer 204. According to the illustrated example of FIG. 7, part of the outer layer 206 has been removed to expose the outer portion 602 of the intermediate layer 204, and part of the intermediate layer 204 has been removed to expose the outer portion 604 of the inner layer 202. As shown in FIG. 7, the intermediate layer 204 is arranged along the outer portion 602 of the inner layer 202, and the outer layer 206 is arranged along the outer portion 604 of the intermediate layer 204. In particular, the intermediate layer 204 of FIG. 7 includes a third plurality of members (e.g., longitudinal members) 702, 704 positioned adjacent each other and extending along the axis 106. The third plurality of members 702, 704 of FIG. 7 include rods and/or tubes. However, in some examples, some or all of the third plurality of members 702, 704 are implemented differently.

FIG. 8 is a cross-sectional view of the intermediate layer 204 taken along plane B-B of FIG. 7. According to the illustrated example of FIG. 8, the third plurality of members 702, 704 are radially distributed relative to the axis 106 to at least partially form and/or define the inner space 212 of the intermediate layer 204 through which the inner layer 202 is to extend. In some examples, the third plurality of members 702, 704 of FIG. 8 are connected and/or coupled together, for example, via one or more fasteners and/or one or more fastening methods or techniques. As such, the intermediate layer 204 of FIG. 8 extends continuously around the axis 106. Accordingly, the intermediate layer 204 of FIG. 8 does not include any slits.

FIG. 9 is an enlarged partial view of the intermediate layer 204 of FIG. 8. According to the illustrated example of FIG. 9, the third plurality of members 702, 704 are the same size and shape relative to each other. Further, each of the third plurality of members 702, 704 of FIG. 9 has a cross-sectional area, a shape of which is substantially circular.

FIG. 10 is another enlarged partial view of the intermediate layer 204 of FIG. 8. According to the illustrated example of FIG. 10, the third plurality of members 702, 704 are substantially the same shape relative to each other. However, unlike the illustrated example of FIG. 8, the third plurality of members 702, 704 of FIG. 9 are sized differently relative to each other. Thus, in some examples, some or all of the third plurality of members 702, 704 are sized and/or shaped the same relative to the each other. On the other hand, in some examples, some or all of the third plurality of members 702, 704 are sized and/or shaped differently relative to the each other. Although FIGS. 9 and 10 depict certain aspects in connection with the third plurality of members 702, 704, in some examples, such aspects likewise apply to one or more other members of the intermediate layer 204.

FIG. 11 is another partial view of the support structure 102 of FIG. 1 and shows part of the intermediate layer 204. According to the illustrated example of FIG. 6, part of the outer layer 206 has been removed to expose the outer portion 602 of the intermediate layer 204, and part of the intermediate layer 204 has been removed to expose the outer portion 604 of the inner layer 202. As shown in FIG. 11, the intermediate layer 204 is arranged along the outer portion 602 of the inner layer 202, and the outer layer 206 is arranged along the outer portion 604 of the intermediate layer 204. In particular, the intermediate layer 204 of FIG. 11 includes a fourth plurality of members (e.g., longitudinal members) 1102, 1104 that are positioned adjacent each other and extend along the axis 106. The fourth plurality of members 1102, 1104 of FIG. 11 includes slats forming faceted shapes. However, in some examples, some or all of the fourth plurality of members 1102, 1104 are implemented differently.

FIG. 12 is a cross-sectional view of the intermediate layer 204 taken along line C-C of FIG. 11. According to the illustrated example of FIG. 12, the fourth plurality of members 1102, 1104 are spaced from each other. Further, the fourth plurality of members 1102, 1104 of FIG. 12 are radially distributed relative to the axis 106 to at least partially form and/or define the inner space 212 of the intermediate layer 204 through which the inner layer 202 is to extend. 16 of the fourth plurality of members 1102, 1104 are shown in this example. However, in some examples, the intermediate layer 204 of FIG. 12 is implemented using one or more fewer or additional ones of the fourth plurality of members 1102, 1104.

FIG. 13 is an enlarged partial view of the intermediate layer 204 of FIG. 12. According to the illustrated example of FIG. 13, adjacent ones of the fourth plurality of members 1102, 1104 are engaging and/or directly contacting each other. Additionally, in some examples, at least some of the adjacent ones of the fourth plurality of members 1102, 1104 are connected and/or coupled together, similar to the third plurality of members 702, 704. In such examples, the intermediate layer 204 is provided with a plurality of joints (e.g., movable joints such as hinges) 1300 movably coupling the adjacent ones of the fifth plurality of members 1102, 1104 together, one of which is shown in this example. In such examples, the adjacent ones of the fifth plurality of members 1102, 1104 are pivotable relative to a respective one of the plurality of joints 1300. Although FIG. 13 depicts certain aspects in connection with the fourth plurality of members 1102, 1104, in some examples, such aspects likewise apply to one or more other members of the intermediate layer 204.

Thus, in some examples, the intermediate layer 204 is implemented using some or all of the plurality of members 220, 222, 402, 404, 702, 704, 1102, 1104 of FIGS. 2 and 4-13. As previously mentioned, some are all of the plurality of members 220, 222, 402, 404, 702, 704, 1102, 1104 include one or more threads, one or more sheets, one or more tubes, one or more rods, one or more slats, etc., any other suitable longitudinal member(s), or a combination thereof. According to the one or more disclosed examples, the plurality of members 220, 222, 402, 404, 702, 704, 1102, 1104 can be constructed of, for example, any of aluminum, fiberglass, steel, carbon fiber, etc., any other suitable material(s), or a combination thereof. In some examples, when used to implement the intermediate layer 204, some or all of the plurality of members 220, 222, 402, 404, 702, 704, 1102, 1104 have respective cross-sectional areas that are unique in terms of size, shape, and/or material, each of which contributes to the rigidity and/or compressive strength of the intermediate layer 204. In this manner, some or all of the plurality of members 220, 222, 402, 404, 702, 704, 1102, 1104 can be advantageously configured to provide a desired rigidity and/or compressive strength of the intermediate layer 204.

Figure 14:
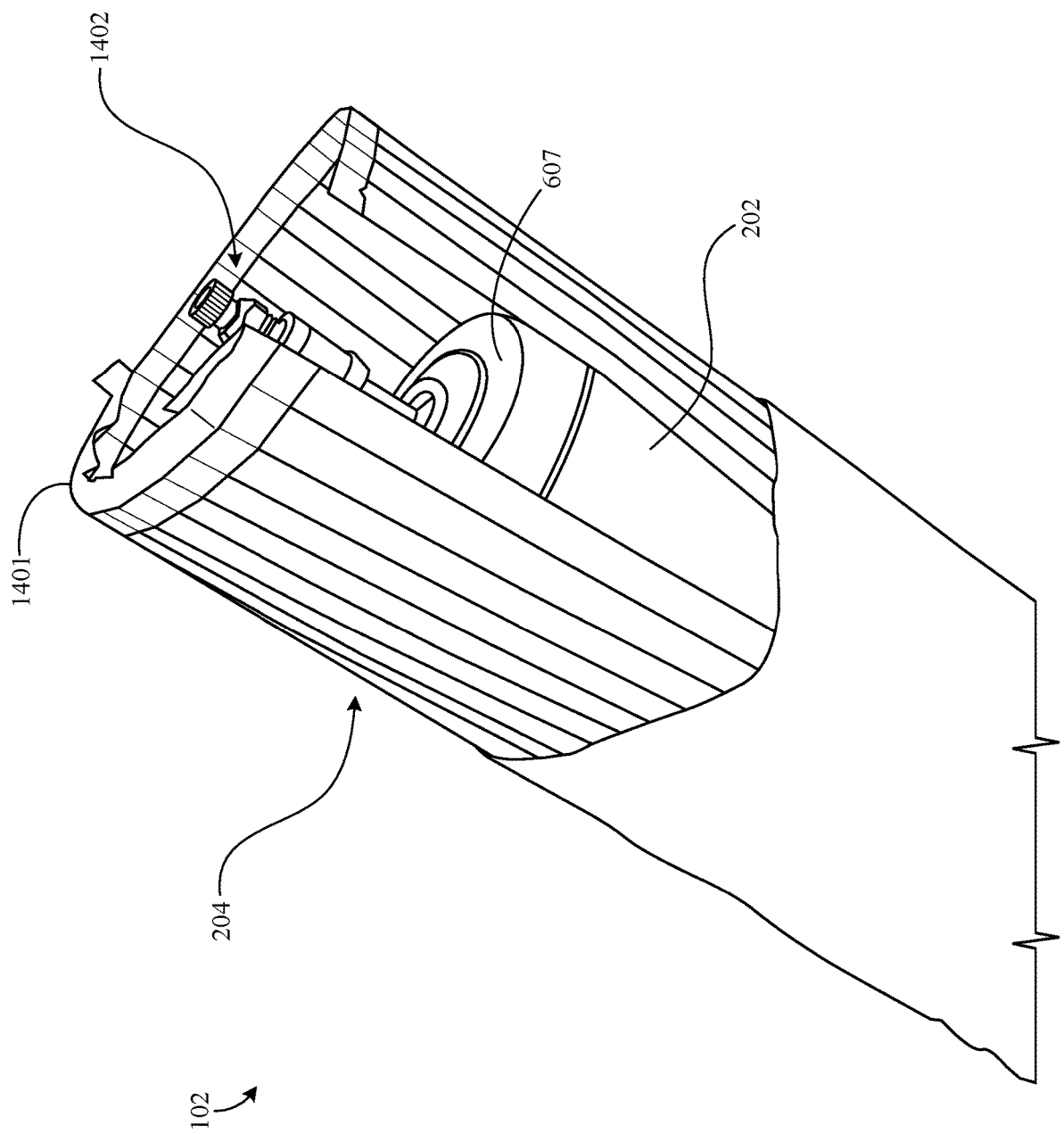
FIGS. 14 and 15 are other partial views of exemplary inflatable support structures in accordance with the teachings of this disclosure.

FIG. 14 is another partial view of the support structure 102 of FIG. 1. According to the illustrated example of FIG. 14, the first cap 116 has been removed from the first end 112 of the support structure 102 to expose part of the inner and intermediate layers 202, 204, for clarity. As shown in FIG. 14, the intermediate layer 204 includes an end (e.g., a load bearing end) 1401 configured to receive the load 103. In some examples, the support structure 102 of FIG. 14 includes an example fluid valve (e.g., a pressure release valve) 1402 coupled to the inner layer 202. As shown in FIG. 14, the fluid valve 1402 is positioned at or near the end 607 of the inner layer 202. In particular, the fluid valve 1402 of FIG. 14 is fluidly coupled to the first opening 606 on the inner layer 202. In such examples, the fluid valve 1402 is configured to control one or more parameters of the fluid 108 based on a position of the fluid valve 1402. For example, the fluid valve 1402 is configured to open (e.g., during inflation or deflation of the inner layer 202), thereby allowing the fluid 108 to flow through the fluid valve 1402 into or out of the fluid chamber 216. On the other hand, the fluid valve 1402 is also configured to close (e.g., after inflation of the inner layer 202), thereby preventing the fluid 108 from flowing through the fluid valve 1402 into or out of the fluid chamber 216.

Figure 15:
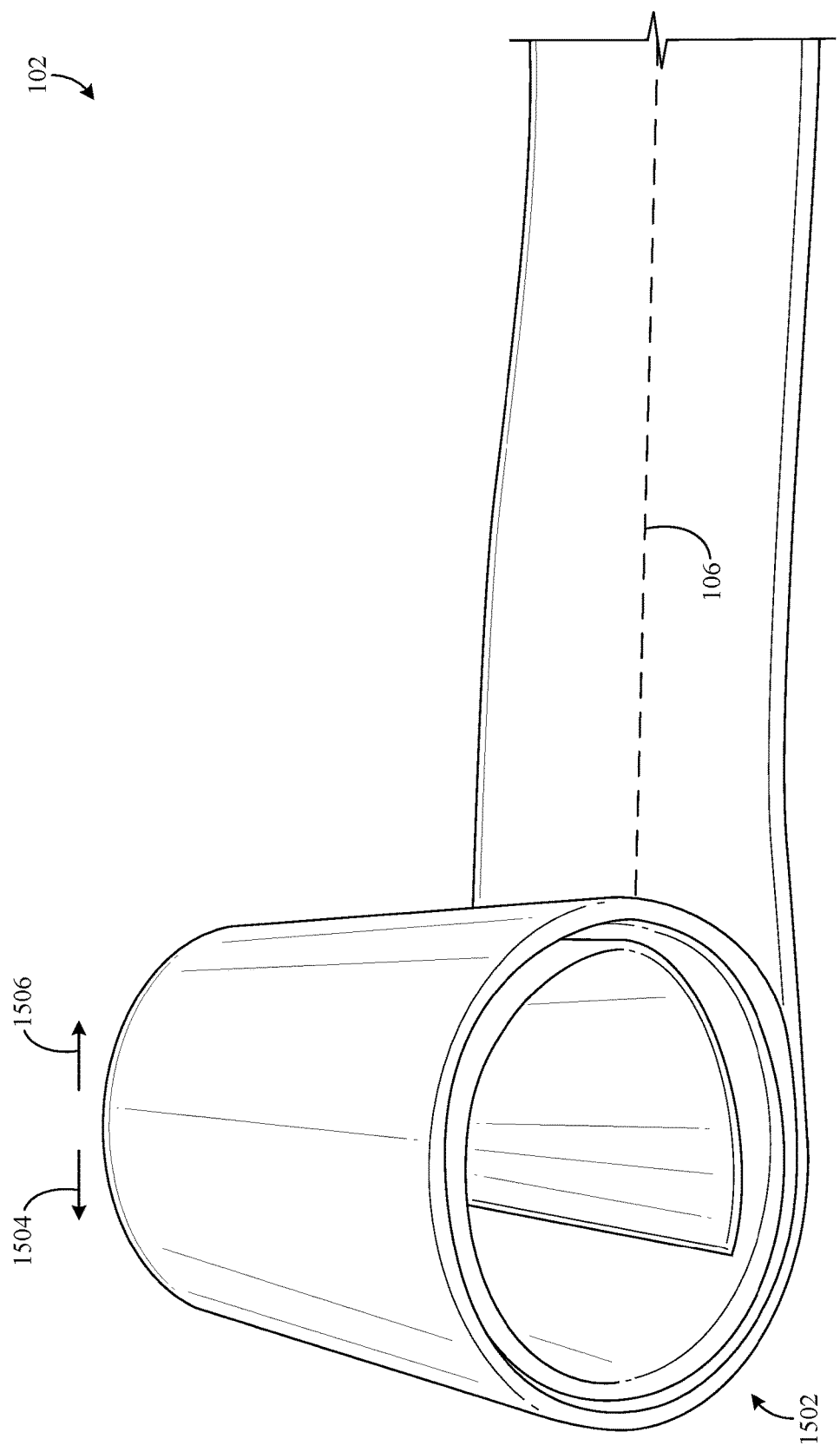

FIG. 15 is another partial view of the support structure 102 of FIG. 1. According to the illustrated example of FIG. 15, the support structure 102 is substantially deflated and folded. For example, the pressure of the fluid 108 is below the second threshold fluid pressure, and/or the intermediate layer 204 is in the first state thereof. In particular, the support structure 102 of FIG. 15 is substantially flexible and/or malleable such that the support structure 102 can be rolled and/or unrolled along the axis 106. As shown in FIG. 15, a portion of the support structure 102 is rolled-up and/or forms an example roll 1502, and an adjacent portion of the support structure 102 is unrolled. In some examples, when deploying the support structure 102, each of the inner layer 202, the intermediate layer 204, the outer layer 206, and/or, more generally, the support structure 102 of FIG. 15 can further unroll along the axis 106 in a first direction 1504 while (a) the pressure of the fluid 108 is below the second threshold fluid pressure and/or (b) the intermediate layer 204 is in the first state thereof. On the other hand, in some examples, to store the support structure 102, each of the inner layer 202, the intermediate layer 204, the outer layer 206, and/or, more generally, the support structure 102 of FIG. 15 can further roll-up along the axis 106 in a second direction 1506, opposite the first direction 1504, while (a) the pressure of the fluid 108 is below the second threshold fluid pressure and/or (b) the intermediate layer 204 is in the first state thereof.

According to the illustrated example of FIG. 15, the support structure 102 can be rolled and/or unrolled manually. Additionally or alternatively, in some examples, the adjuster mechanism 120 is configured to similarly manipulate the support structure 102, as discussed further below. In any case, such manipulation of the support structure 102 facilitates reducing a space occupied by the support structure 102 when stored.

Figure 16:
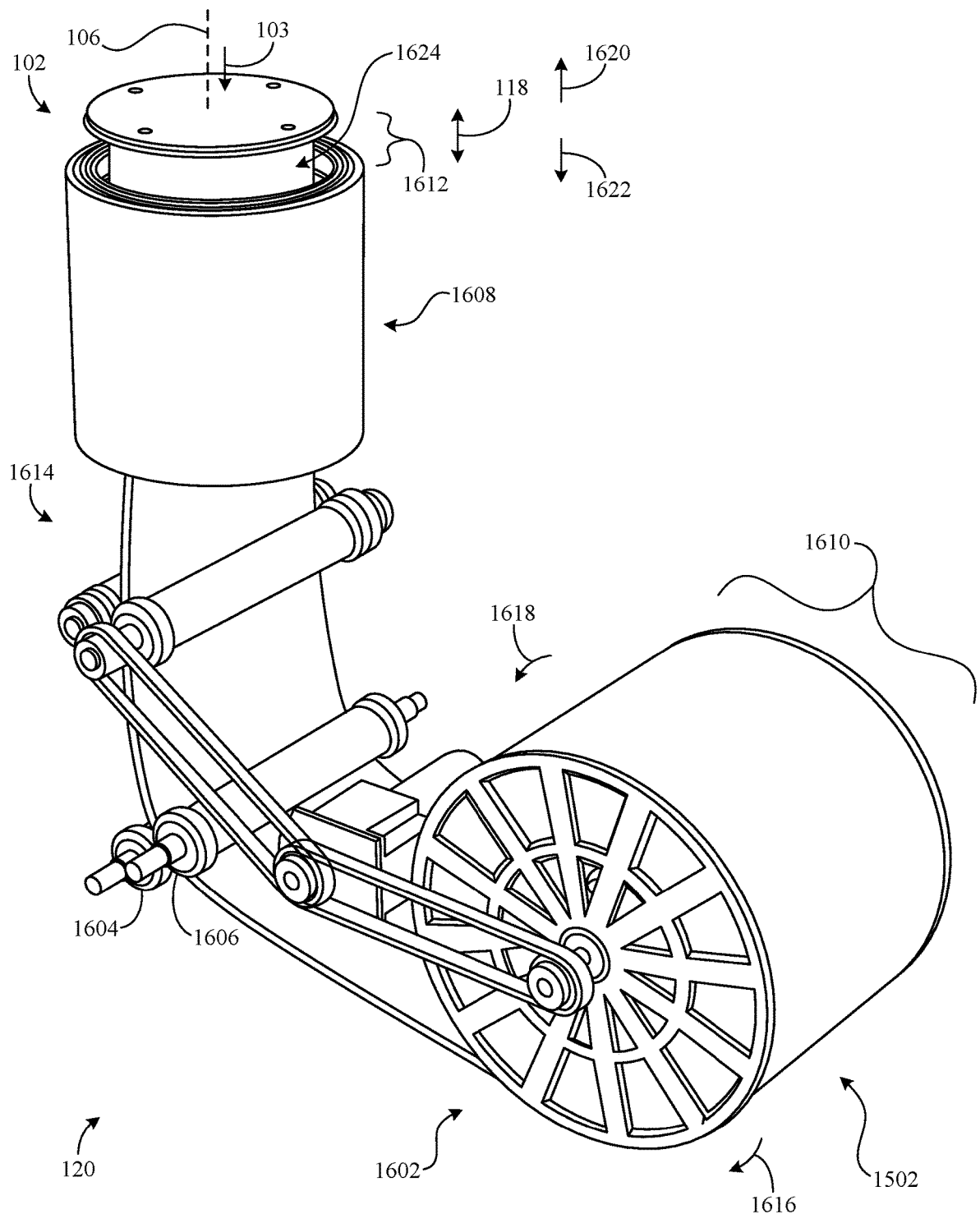
FIG. 16 is a view of an exemplary adjuster mechanism in accordance with the teachings of this disclosure.

FIG. 16 is a view of an exemplary adjuster mechanism 120 of the system 100 of FIG. 1. As previously mentioned, the adjuster mechanism 120 is configured to roll and/or unroll the support structure 102 to adjust the length 118 of the support structure 102. According to the illustrated example of FIG. 16, the adjuster mechanism 120 includes an example reel 1602, a plurality of pinchers 1604, 1606, and a transitional support (e.g., a collar) 1608, each of which is supported by an outer housing or enclosure (not shown) of the adjuster mechanism 120. The reel 1602 is configured to hold and/or carry a deflated portion 1610 of the support structure 102 that forms the roll 1502. Further, the transitional support 1608 is configured to provide support to an inflated portion 1612 of the support structure 102 connected to the deflated portion 1610. In particular, the transitional support 1608 of FIG. 16 resists shear force over the length 118 of the support structure 102 as part of the intermediate layer 204 transitions from the first state to the second state. Further still, the plurality of pinchers 1604, 1606 is configured to the pinch and/or fold part of the support structure 102 engaged between the plurality of pinchers 1604, 1606, which forms a transition zone 1614 of the support structure 102 positioned between the deflated portion 1610 and the inflated portion 1612. In particular, the plurality of pinchers 1604, 1606 of FIG. 16 prevents a fluid flow into the deflated portion 1610. Additionally, the plurality of pinchers 1604, 1606 of FIG. 16 also support a vertical load associated with the support structure 102 such as, for example, the load 103. On the other hand, the reel 1602 of FIG. 16 does not support the load 103 or any portion thereof.

The reel 1602 of FIG. 16 is configured to rotatably couple to the enclosure of the adjuster mechanism 120, for example, via one or more bearings. In particular, the reel 1602 is rotatable relative to the enclosure in a first rotational direction (e.g., clockwise) 1616 and/or a second rotational direction (e.g., counterclockwise) 1618 opposite the first rotational direction 1616. In some examples, the reel 1602 of FIG. 16 is configured to rotate relative to the enclosure in the first rotational direction 1616 to unroll the deflated portion 1610 of the support structure 102 while the inflated portion 1612 of the support structure 102 further inflates. In such examples, the support structure 102 extends along the axis 106 and/or moves away from the enclosure in a third direction (e.g., a vertical direction) 1620 as the deflated portion 1610 unrolls. Conversely, in some examples, the reel 1602 of FIG. 16 is configured to rotate relative to the enclosure in the second rotational direction 1618 to further roll up of the deflated portion 1610 while the inflated portion 1612 deflates. In such examples, the support structure 102 retracts and/or moves toward the enclosure in a fourth direction (e.g., a vertical direction) 1622, opposite relative to the third direction 1620, as the deflated portion 1610 rolls up.

In some examples, the pressure of the fluid 108 urges the support structure 102 to extend and/or otherwise move away from the enclosure in the third direction 1620, which causes the reel 1602 to unroll the deflated portion 1610. For example, the inflated portion 1612 applies a first force or torque to the reel 1602 to turn the reel 1602. In such examples, the support structure 102 is pulled through the plurality of pinchers 1604, 1606 as a result of the pressure of the fluid 108. On the other hand, in some examples, a second force or torque applied to the reel 1602 causes the reel 1602 to rotate in the second rotational direction 1618, which similarly pulls the support structure 102 through the plurality of pinchers 1604, 1606. The second force or torque can be provided, for example, by one or more users and/or an actuator. As such, in some examples, the reel 1602 is configured for manual operation. In such examples, the adjuster mechanism 120 includes a handle or lever that is coupled to reel 1602 and operable by one or more users to manually turn the reel 1602. Additionally or alternatively, in some examples, adjuster mechanism 120 also includes an example actuator (e.g., an electric motor) operatively coupled to the reel 1602 and configured to turn the reel 1602.

The transitional support 1608 of FIG. 16 is configured to couple to the enclosure of the adjuster mechanism 120, for example, via one or more fasteners and/or one or more fastening methods or techniques. In some examples, the transitional support 1608 of FIG. 16 extends at least partially around an outer portion 1624 of the support structure 102. As shown in FIG. 16, the transitional support 1608 surrounds the outer portion 1624 of the support structure 102. Additionally, in some examples, the transitional support 1608 is configured to engage (e.g., slidably engage) the outer portion 1624 of the support structure 102, thereby providing the support to the support structure 102 when the support structure 102 is extending, retracting, and/or fully deployed.

Each of the plurality of pinchers 1604, 1606 of FIG. 16 is configured to rotatably couple to the enclosure of the adjuster mechanism 120, for example, via one or more bearings. As previously mentioned, the plurality of pinchers 1604, 1606 is configured to pinch and/or fold the support structure 102. In some examples, as the support structure 102 is pulled through the plurality of pinchers 1604, 1606, the plurality of pinchers 1604, 1606 continuously urges part the intermediate layer 204 into the second state thereof. In this manner, the plurality of pinchers 1604, 1606 provide the deflated portion 1610 of the support structure 102. As a result of such engagement between the support structure 102 and the plurality of pinchers 1604, 1606, the plurality of pinchers 1604, 1606 keeps the fluid 108 in the transition zone 1614 and the inflated portion 1612 while preventing the fluid 108 from entering the deflated portion 1610 of the support structure 102.

In some examples, rotation of the reel 1602 in the second rotational direction 1618 causes the pressure of the fluid 108 in the inflated portion 1612 to increase. In such examples, when the pressure of the fluid 108 in the inflated portion 1612 is at or above a third threshold fluid pressure (e.g., a value corresponding to a fluid pressure), the valve 1402 is configured to open to expel the fluid 108 from the first opening 606.

Figure 17:
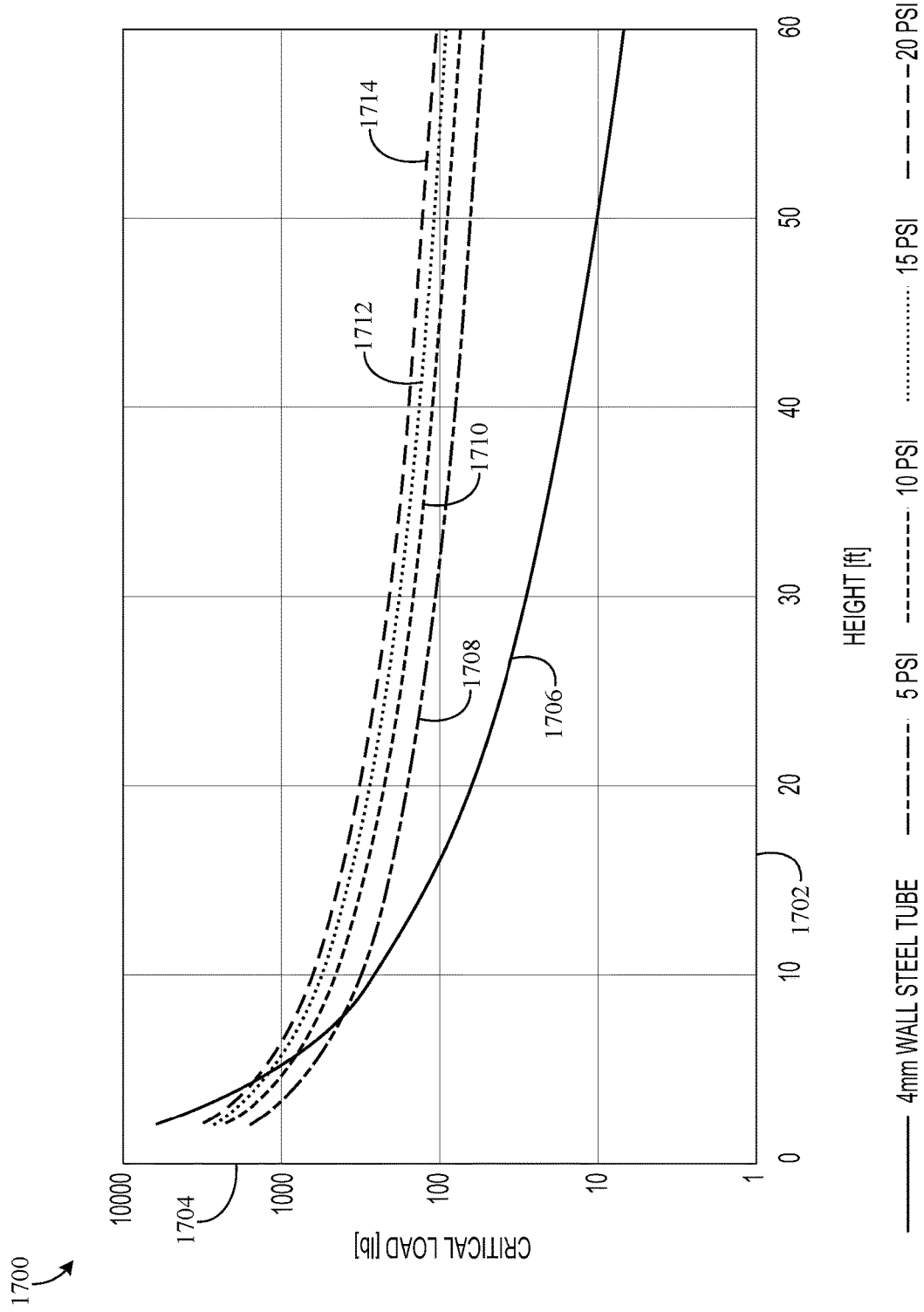
FIG. 17 illustrates a first graph showing a comparison at a range of fluid pressures for an exemplary inflatable support structure as compared with a rigid steel tube with a wall thickness of 4 millimeters (mm)

FIG. 17 illustrates a first graph 1700 showing a comparison at a range of fluid pressures for the inflatable support structure 102 as compared with a rigid steel tube with a wall thickness of 4 (mm). According to the illustrated example of FIG. 17, the first graph 1700 includes a first axis (e.g., an x-axis) 1702 representing a height (e.g., in ft) at which a payload is supported and a second axis (e.g., a y-axis) 1704 representing a critical load (e.g., in lb) associated with causing structural failure (e.g., buckling) to occur.

As shown in FIG. 17, the first graph 1700 includes a first plot 1706 representing a loading capacity of the rigid steel tube based on a length of the rigid steel tube. The first graph 1700 of FIG. 17 also includes a second plot 1708 representing a loading capacity of the inflatable support structure 102 based on the length 118 when the fluid 108 in the inner layer 202 is substantially at a first fluid pressure (e.g., 5 PSI). Further, the first graph 1700 also includes a third plot 1710 representing a loading capacity of the inflatable support structure 102 based on the length 118 when the fluid 108 in the inner layer 202 is substantially at a second fluid pressure (e.g., 10 PSI). Further still, the first graph 1700 also includes a fourth plot 1712 representing a loading capacity of the inflatable support structure 102 based on the length 118 when the fluid 108 in the inner layer 202 is substantially at a fluid third pressure (e.g., 15 PSI). Further still, the first graph 1700 also includes a fifth plot 1714 representing a loading capacity of the inflatable support structure 102 based on the length 118 when the fluid 108 in the inner layer 202 is substantially at a fourth fluid pressure (e.g., 20 PSI).

According to the illustrated example of FIG. 17, the rigid steel tube weighs approximately the same as the inflatable support structure 102 that is backed by the fluid pressure. At relatively short lengths (e.g., less than 8 feet), the rigid steel tube resists buckling slightly better than the inflatable support structure 102 at relatively low pressure. At moderate air pressures of the inflatable support structure 102, the rigid steel tube must be reduced to around 5 feet to be of comparable strength.

Figure 18:
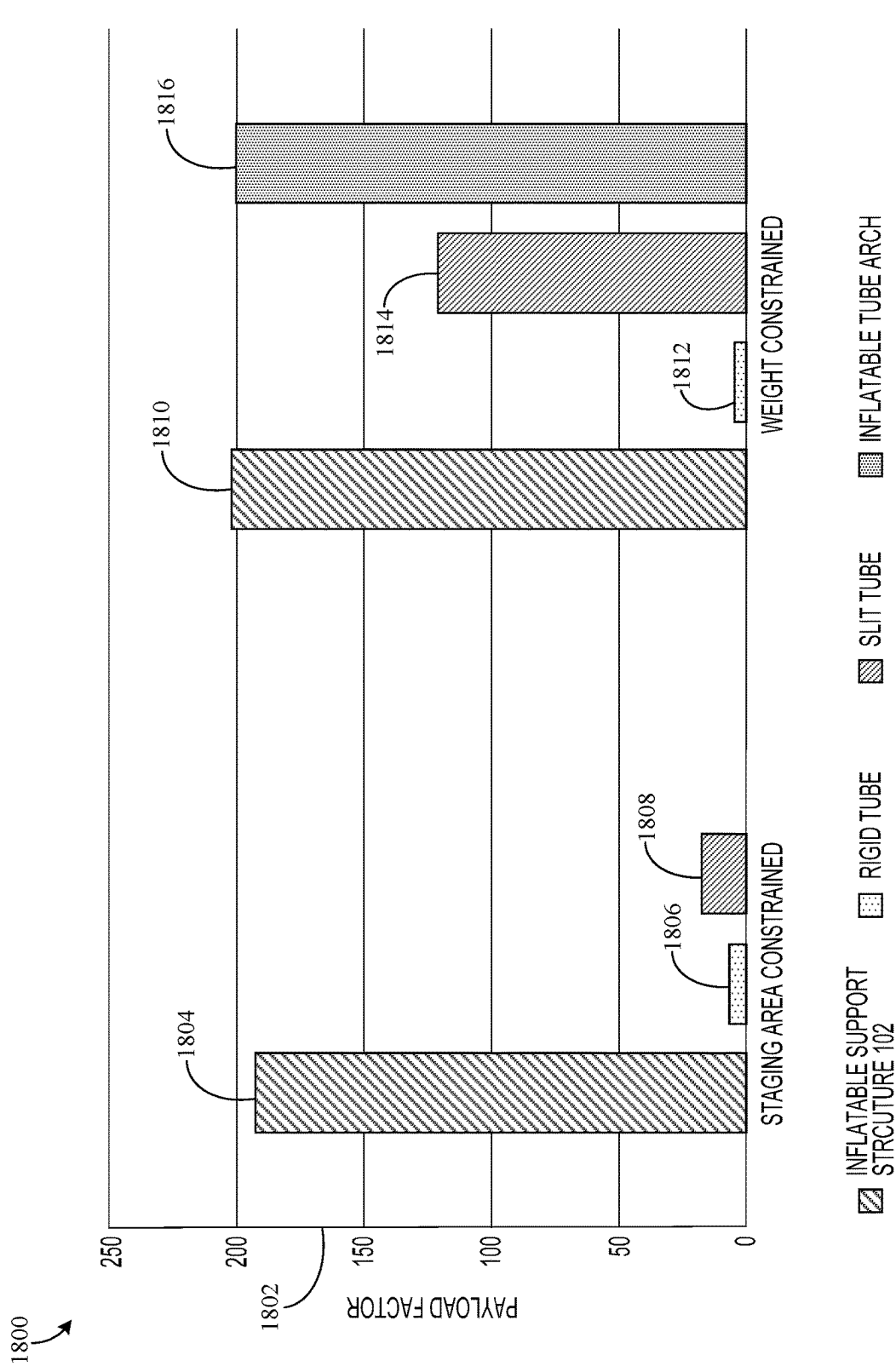
FIG. 18 illustrates a second graph showing a comparison of payload factors for several tube types.

FIG. 18 illustrates a second graph 1800 showing a comparison of payload factors for several tube types, using staging area and weight as constraints. According to the illustrated example of FIG. 18, the second graph 1800 includes an axis (e.g., a y-axis) 1802 representing a payload factor, which is a nondimensional metric relating stowed size and weight with deployed size and payload.

As shown in FIG. 18, the second graph 1800 includes a first bar 1804 representing a first payload factor of the inflatable support structure 102 with respect to a staging area constraint associated with the inflatable support structure 102. The second graph 1800 of FIG. 18 also includes a second bar 1806 representing a second payload factor of the rigid steel tube with respect to a staging area constraint associated with the rigid steel tube. Further, the second graph 1800 also includes a third bar 1808 representing a third payload factor of a slit tube that is backed by air pressure with respect to a staging area constraint associated with the slit tube. According to the illustrated example of FIG. 18, the first payload factor of the inflatable support structure 102 is about 200 when the inflatable support structure 102 is inflated. That is, in some examples, the first payload factor is within +/−5% of 200. In other words, in such examples, the first payload factor is between 190 and 210.

Additionally, the second graph 1800 of FIG. 18 also includes a fourth bar 1810 representing a fourth payload factor of the inflatable support structure 102 with respect to a weight constraint associated with the inflatable support structure 102. The second graph 1800 of FIG. 18 also includes a fifth bar 1812 representing a fifth payload factor of the rigid steel tube with respect to a weight constraint associated with the rigid steel tube. Further, the second graph 1800 also includes a sixth bar 1814 representing a sixth payload factor of the slit tube that is backed by air pressure with respective to a weight constraint associated with the slit tube. Further still, the second graph 1800 also includes a seventh bar 1816 representing a seventh payload factor of an inflatable tube arch with respect to a weight constraint associated with the inflatable tube arch. As shown in FIG. 18, the fourth payload factor of the inflatable support structure 102 is about 200.

With respect to the payload factor using staging area and weight as constraints, the rigid tube is poor in both categories because of its inability to stow compactly. The slit tube benefits from being very light but lacks the ability to carry large loads when system weight is neglected. The inflatable tube arch is limited by its need for a large area on the ground to be useful when staging area is constrained. A secondary concern for the inflatable arch is the required air volume, which is roughly 700 times that of the inflatable support structure 102 and would need to be supplied at 65 psi to achieve the requisite strength. Considering both staging area and weight constraints, the inflatable support structure 102 is the best alternative.

Figure 19:
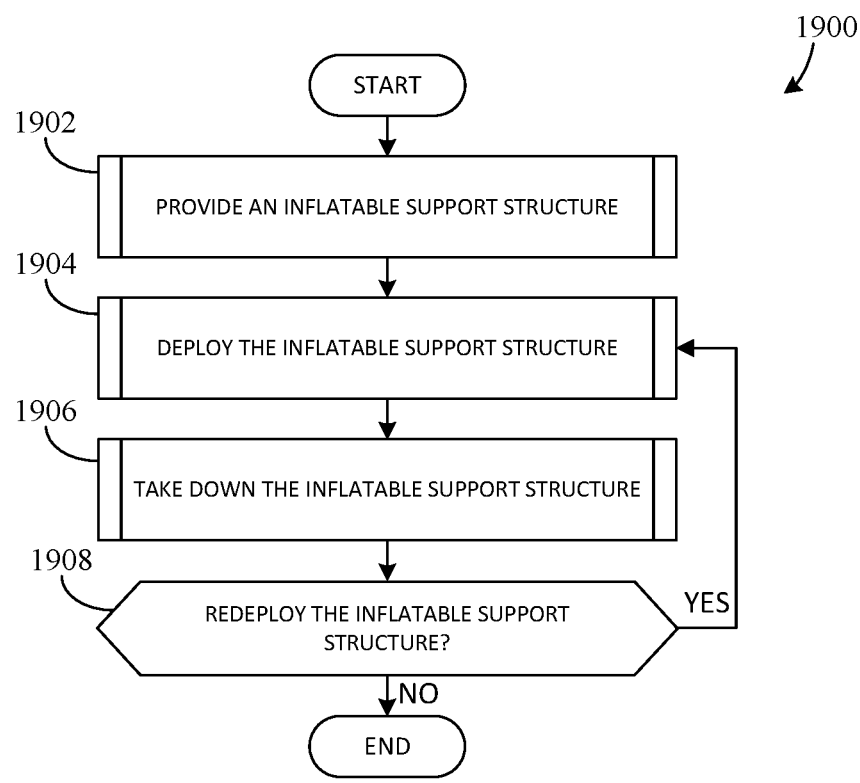
FIGS. 19-22 are flowcharts representative of exemplary methods that can be executed to implement one or more embodiments disclosed herein.

FIG. 19 is a flowchart representative of an example method 1900 that can be executed to implement one or more examples disclosed herein. The example method 1900 of FIG. 19 can be implemented in the example system 100 of FIG. 1.

The example method 1900 of FIG. 19 begins by providing an inflatable support structure (block 1902). In some examples, the example support structure 102 of FIGS. 1-7, 11, and/or 14-16 is provided.

The example method 1900 of FIG. 19 also includes deploying the inflatable support structure (block 1904). In some examples, the example support structure 102 of FIGS. 1-7, 11, and/or 14-16 is deployed. In particular, the support structure 102 is configured to support the payload 103 while deployed.

The example method 1900 of FIG. 19 also includes taking down the inflatable support structure (block 1906). In some examples, the example support structure 102 of FIGS. 1-7, 11, and/or 14-16 is taken down. In particular, the support structure 102 is storable for later use after the deployment in connection with block 1904.

The example method 1900 of FIG. 19 also includes determining whether to redeploy the inflatable support structure (block 1906). In some examples, if redeployment of the support structure 102 of FIGS. 1-7, 11, and/or 14-16 is desired (block 1906: YES), control of the example method 1900 of FIG. 19 returns to block 1904. On the other hand, in some examples, if redeployment of the support structure 102 is not desired (block 1906: NO), the example method 1900 of FIG. 19 ends.

Although the example method 1900 is described in connection with the flowchart of FIG. 19, other methods of implementing the example system 100 may be alternatively used. For example, the order of execution of the blocks 1902, 1904, 1906, 1908 may be changed, and/or some of the blocks 1902, 1904, 1906, 1908 described may be changed, eliminated, or combined.

Figure 20:
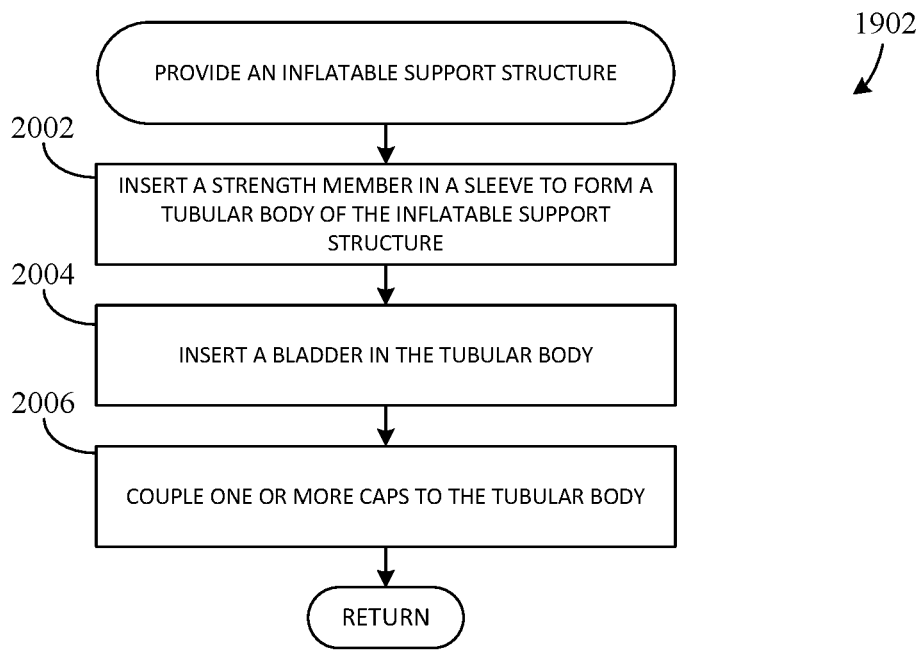

FIG. 20 is another flowchart representative of an example method 1902 that can be executed to implement one or more examples disclosed herein. The example method 1902 of FIG. 20 can be implemented in the example system 100 of FIG. 1. Example operations of blocks 2002, 2004, 2006 may be used to implement block 1902 of FIG. 19. In particular, the example method 1902 of FIG. 20 is effective in providing an inflatable support structure in accordance with the teachings of this disclosure.

The example method 1902 of FIG. 20 begins by inserting a strength member in a sleeve to form a tubular body of the inflatable support structure 102 (block 2002). In some examples, the intermediate layer 204 is inserted in the outer layer 206 to form the primary body 104 of the support structure 102.

The example method 1902 of FIG. 20 also includes inserting a bladder in the tubular body (block 2004). In some examples, the inner layer 202 is inserted in the primary body 104, for example, by pulling the inner layer 202 through the inner space 212.

The example method 1902 of FIG. 20 also includes coupling one or more caps to the body (block 2006). In some examples, at least the first cap 116 is coupled to the primary body 104 of the support structure 102 at or adjacent the first end 112 thereof.

Then, control of the example method 1902 of FIG. 20 returns to a calling function such as the example method 1900 of FIG. 19.

Although the example method 1902 is described in connection with the flowchart of FIG. 20, other methods of implementing the example system 100 may be alternatively used. For example, the order of execution of the blocks 2002, 2004, 2006 may be changed, and/or some of the blocks 2002, 2004, 2006 described may be changed, eliminated, or combined.

Figure 21:
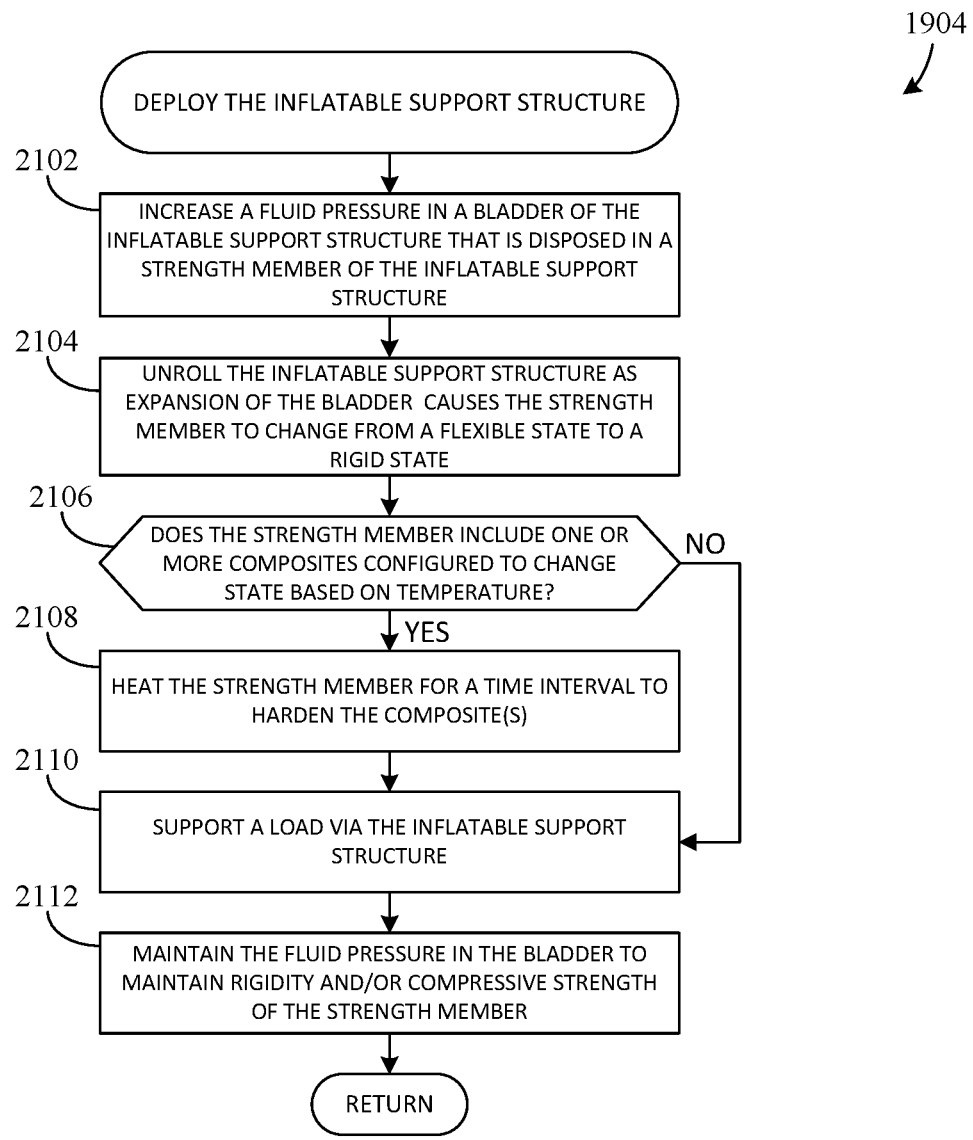

FIG. 21 is another flowchart representative of an example method 1904 that can be executed to implement one or more examples disclosed herein. The example method 1904 of FIG. 21 can be implemented in the example system 100 of FIG. 1. Example operations of blocks 2102, 2104, 2106, 2108, 2110, 2112 may be used to implement block 1904 of FIG. 19. In particular, the example method 1904 of FIG. 21 is effective in deploying an inflatable support structure in accordance with the teachings of this disclosure.

The example method 1904 of FIG. 21 begins by increasing a fluid pressure in a bladder of the inflatable support structure that is disposed in a strength member of the inflatable support structure (block 2102). In some examples, the fluid pressure in the inner layer 202 of FIGS. 2-7, 11, and/or 14 is increased, for example, via the fluid control system 114. As a result, in such examples, the inner layer 202, when inflated, urges the intermediate layer 204 into engagement with the outer layer 206 to increase the rigidity and/or compressive strength of the intermediate layer 204 along the axis 106.

The example method 1904 of FIG. 21 also includes unrolling the inflatable support structure as expansion of the bladder causes the strength member to change from a flexible state to a rigid state (block 2104). In some examples (e.g., where the system 100 includes the adjuster mechanism 120), the support structure 102 of FIGS. 1-7, 11, and/or 14-16 is configured to unroll as expansion of the inner layer 202 causes at least part of the intermediate layer 204 to change from the first state to the second state. In such examples, during such an inflation process, the reel 1602 rotates relative to the enclosure of the adjuster mechanism 120 in the first rotational direction 1616 as the pressure of the fluid 108 in the inner layer 202 urges the support structure 102 to extend along the axis 106 in the third direction 1620. Alternatively, in some examples (e.g., where the system 100 does not include the adjuster mechanism 120), the support structure 102 is fully unrolled (e.g., manually) prior to the operation of block 2102.

The example method 1904 of FIG. 21 also includes determining whether the strength member includes one or more composites configured to change state based on temperature (block 2106). In some examples, if the intermediate layer 204 of FIGS. 2-14 does not include one or more composites configured to change state based on temperature (block 2106: NO), control of the example method 1904 of FIG. 21 proceeds to block 2110. On the other hand, in some examples, if the intermediate layer 204 of FIGS. 2-14 includes the composite(s) (block 2106: YES), control of the example method proceeds to block 2108.

The example method 1904 of FIG. 21 also includes heating the strength member for a time interval to harden the composite(s) (block 2108). In some examples, the intermediate layer 204 of FIGS. 2-14 is heated for a first time interval to harden the composite(s) of the intermediate layer 204, for example, via solar radiation.

The example method 1904 of FIG. 21 also includes supporting a load via the inflatable support structure (block 2110). In some examples, the load 103 of FIG. 1 is supported via the support structure 102. For example, the support structure 102 is configured to hold (a) 500 pounds (lb) at 35 feet (ft) and/or (b) 250 lb at 50 ft when the fluid 108 is at or above the fourth fluid pressure (e.g., 20 PSI).

The example method 1904 of FIG. 21 also includes maintaining the fluid pressure in the bladder to maintain rigidity and/or compressive strength of the strength member (block 2112). In some examples, the fluid pressure in the inner layer 202 of FIGS. 2-7, 11, and/or 14 is maintained (e.g., via closing the valve 1402) to maintain the rigidity and/or compressive strength of the intermediate layer 204.

Then, the example method 1904 of FIG. 21 returns to a calling function such as the example method 1900 of FIG. 19.

Although the example method 1904 is described in connection with the flowchart of FIG. 21, other methods of implementing the example system 100 may be alternatively used. For example, the order of execution of the blocks 2102, 2104, 2106, 2108, 2110, 2112 may be changed, and/or some of the blocks 2102, 2104, 2106, 2108, 2110, 2112 described may be changed, eliminated, or combined. In some examples (e.g., where the system 100 includes the adjuster mechanism 120), block 2110 can be executed, for example, prior to or during the execution of block 2102 or block 2104. In such examples, the support structure 102 is configured to support the load 103 during inflation of the support structure 102.

Figure 22:
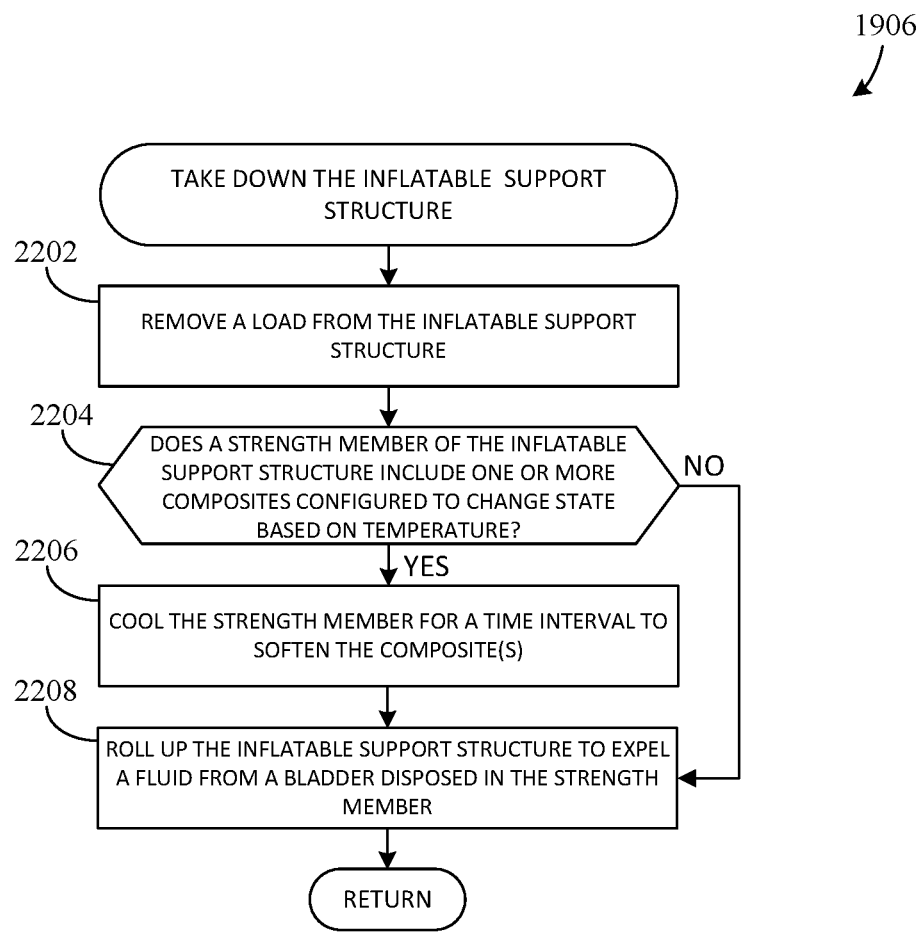

FIG. 22 is another flowchart representative of an example method 1906 that can be executed to implement one or more examples disclosed herein. The example method 1906 of FIG. 22 can be implemented in the example system 100 of FIG. 1. Example operations of blocks 2202, 2204, 2206, 2208 may be used to implement block 1906 of FIG. 19. In particular, the example method 1906 of FIG. 22 is effective in taking down an inflatable support structure in accordance with the teachings of this disclosure.

The example method 1906 of FIG. 22 begins by removing a load from the inflatable support structure (block 2202). In some examples, the load 103 of FIG. 1 is removed from the support structure 102.

The example method 1906 of FIG. 22 also includes determining whether a strength member of the inflatable support structure includes one or more composites configured to change state based on temperature (block 2204). In some examples, if the intermediate layer 204 of FIGS. 2-14 does not include one or more composites configured to change state based on temperature (block 2204: NO), control of the example method 1906 of FIG. 22 proceeds to block 2208. On the other hand, in some examples, if the intermediate layer 204 of FIGS. 2-14 includes the composite(s) (block 2204: YES), control of the example method proceeds to block 2206.

The example method 1906 of FIG. 22 also includes cooling the strength member for a time interval to soften the composite(s) (block 2206). In some examples, the intermediate layer 204 of FIGS. 2-14 is cooled for a second time interval to soften the composite(s) of the intermediate layer 204.

The example method 1906 of FIG. 22 also includes rolling up the inflatable support structure to expel a fluid from a bladder disposed in the strength member (block 2208). In some examples (e.g., where the system 100 includes the adjuster mechanism 120), the deflated portion 1610 of the supports structure 102 is rolled up (e.g., via rotating the reel 1602 relative to the enclosure of the adjuster mechanism 120 in the second rotational direction 1618) to expel the fluid 108 from the inner layer 202. As previously mentioned, in such examples, the fluid valve 1402 is configured to open when the fluid pressure in the inner layer 202 is at or above the third threshold fluid pressure. Alternatively, in some examples (e.g., where the system 100 does not include the adjuster mechanism 120), the fluid 108 is first expelled from the inner layer 202 at block 2208, and then the support structure 102 is rolled up (e.g., manually).

Although the example method 1906 is described in connection with the flowchart of FIG. 22, other methods of implementing the example system 100 may be alternatively used. For example, the order of execution of the blocks 2202, 2204, 2206, 2208 may be changed, and/or some of the blocks 2202, 2204, 2206, 2208 described may be changed, eliminated, or combined. In some examples (e.g., where the system 100 includes the adjuster mechanism 120), block 2202 can be executed, for example, during or after the execution of block 2208. In such examples, the support structure 102 is configured to support the load 103 during deflation of the support structure 102.

As used herein, the terms "including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

It will be appreciated that the systems, apparatus, and methods disclosed in the foregoing description provide numerous advantages. Examples disclosed herein provide a system including at least one inflatable support structure that can be rapidly deployed to provide support to a mass and compactly stored prior to deployment. Disclosed examples improve loading performance while reducing weight typically associated with such support structures.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

What is claimed is:

1. An antenna system including a mast configured to support an antenna member, the mast comprising:
    a strength member including an inner space that extends along an axis, the strength member being changeable between a first state in which the strength member is roflable along the axis and a second state in which the strength member is more rigid along the axis than in the first state;
    a sleeve arranged along an outer portion of the strength member; and
    a bladder disposed in the inner space of the strength member and configured to receive a fluid, where the first state and the second state of the strength member are based on a fluid pressure in the bladder,
    wherein the strength member, sleeve, and bladder are configured to be rolled into a coil in the first state.

2. The antenna system of claim 1, wherein the bladder is configured to inflate to provide the second state of the strength member.

3. The antenna system of claim 2, wherein the bladder is configured to urge the strength member into engagement with the sleeve to increase a rigidity of the strength member.

4. The antenna system of claim 3, wherein the sleeve is configured to constrain the strength member.

5. The antenna system of claim 1, wherein the bladder is configured to deflate to provide the first state of the strength member.

6. The antenna system of claim 1, wherein the bladder has a relatively low hoop stiffness and the sleeve has a relatively high hoop stiffness.

7. The antenna system of claim 1, wherein the strength member includes a plurality of longitudinal members that are positioned adjacent each other and extend along the axis.

8. The antenna system of claim 7, wherein the plurality of longitudinal members include sheets, rods, or slats.

9. The antenna system of claim 7, wherein the plurality of longitudinal members are connected together.

10. The antenna system of claim 1, wherein the strength member is woven into the sleeve.

11. The antenna system of claim 1, wherein the mast, when deployed, has a payload factor that is about 200.

12. The antenna system of claim 1, further including an adjuster mechanism operatively coupled to the mast and configured to roll or unroll the mast to adjust a length of the mast.

13. The antenna system of claim 1, wherein the fluid includes a gas.

14. The antenna system of claim 1, wherein the strength member includes a plurality of segments disposed along the axis.

15. An inflatable support structure, comprising:
    an inner layer defining a fluid chamber that extends along an axis;
    an outer layer extending over the inner layer; and
    an intermediate layer interposed between the inner and outer layers and configured to resist a compressive load applied to an end of the intermediate layer, where the inner layer, when inflated, is configured to urge the intermediate layer into engagement with the outer layer to increase a rigidity of the intermediate layer along the axis, and where the outer layer is configured to limit expansion of the intermediate layer in a radially outward direction relative to the axis,
wherein each of the inner layer, the outer layer, and the intermediate layer is rollable along the axis to form a coil while a fluid pressure in the inner layer is below a threshold fluid pressure.

16. The inflatable support structure of claim 15, wherein the inner layer and the outer layer, together, are configured to maintain a cross-sectional shape of the intermediate layer while the fluid pressure in the inner layer is above the threshold fluid pressure, the rigidity of the intermediate layer based at least partially on the cross-sectional shape of the intermediate layer and the fluid pressure.

17. The inflatable support structure of claim 16, wherein the cross-sectional shape of the intermediate layer is substantially circular.

18. The inflatable support structure of claim 15, wherein the inner layer includes a first tubular body that extends alongside a second tubular body of the intermediate layer.

19. A deployable support structure, comprising:
a tubular body including a cross-sectional area that defines an inner space extending along an axis; and
a bladder extending through the inner space and configured to expand or contract to change a shape of the cross-sectional area, where a rigidity of the tubular body is based at least partially on the shape of the cross-sectional area and a fluid pressure in the bladder, and where the tubular body is more rigid along the axis when the fluid pressure is above a first threshold than when the fluid pressure is below a second threshold, the tubular body being rollable along the axis when the fluid pressure is below the second threshold,
wherein the tubular body and the bladder are configured to be rolled into a coil when the fluid pressure is below the second threshold.

20. The deployable support structure of claim 19, wherein the tubular body includes a sleeve and a strength member interposed between the sleeve and the bladder.

* * * * *